United States Patent
Bruno et al.

(10) Patent No.: US 10,528,878 B2
(45) Date of Patent: *Jan. 7, 2020

(54) TAILORING QUESTION ANSWERING SYSTEM OUTPUT BASED ON USER EXPERIENCE

(71) Applicant: International Business Machines Corporation, Armonk, NY (US)

(72) Inventors: Nicholas V. Bruno, Cary, NC (US); Donna K. Byron, Petersham, MA (US); Julius Goth, III, Franklinton, NC (US); Dwi S. Mansjur, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/524,432

(22) Filed: Jul. 29, 2019

(65) Prior Publication Data
US 2019/0347563 A1    Nov. 14, 2019

Related U.S. Application Data

(63) Continuation of application No. 14/460,066, filed on Aug. 14, 2014, now Pat. No. 10,366,332.

(51) Int. Cl.
*G06N 20/00* (2019.01)
*G06N 5/04* (2006.01)
*G06N 5/02* (2006.01)

(52) U.S. Cl.
CPC .............. *G06N 5/04* (2013.01); *G06N 5/022* (2013.01); *G06N 20/00* (2019.01)

(58) Field of Classification Search
None
See application file for complete search history.

(56) References Cited

U.S. PATENT DOCUMENTS

| | | |
|---|---|---|
| 6,195,426 B1 | 2/2001 | Bolduc et al. |
| 8,935,192 B1 | 1/2015 | Ventilla et al. |
| 9,292,791 B2 | 3/2016 | Lu et al. |
| 9,396,236 B1 | 7/2016 | Vanderwater et al. |
| 2003/0009448 A1 | 1/2003 | Covington, Jr. et al. |

(Continued)

FOREIGN PATENT DOCUMENTS

EP    1761015 A1    7/2007

OTHER PUBLICATIONS

List of IBM or Patent Applications Treated as Related (Appendix P), Jul. 29, 2019, 2 pages.

(Continued)

*Primary Examiner* — Kamran Afshar
*Assistant Examiner* — Benjamin J Buss
(74) *Attorney, Agent, or Firm* — Stephen R. Tkacs; Stephen J. Walder, Jr.; Diana R. Gerhardt

(57) ABSTRACT

A mechanism is provided in a data processing system for tailoring question answering system output based on user expertise. The mechanism receives an input question from a questioning user and determines a set of features associated with text of the input question. The mechanism determines an expertise level of the questioning user based on the set of features associated with the text of the input question using a trained expertise model. The mechanism generates one or more candidate answers for the input question and tailors output of the one or more candidate answers based on the expertise level of the questioning user.

20 Claims, 9 Drawing Sheets

(56) References Cited

U.S. PATENT DOCUMENTS

| | | |
|---|---|---|
| 2005/0262114 A1 | 11/2005 | Nevin et al. |
| 2007/0094183 A1 | 4/2007 | Paek et al. |
| 2007/0219863 A1 | 9/2007 | Park et al. |
| 2008/0059308 A1 | 3/2008 | Gerken |
| 2009/0043621 A1 | 2/2009 | Kershaw |
| 2009/0287678 A1 | 11/2009 | Brown et al. |
| 2010/0191686 A1 | 7/2010 | Wang et al. |
| 2011/0066587 A1 | 3/2011 | Ferrucci et al. |
| 2011/0125734 A1 | 5/2011 | Duboue et al. |
| 2011/0212430 A1 | 9/2011 | Smithmier et al. |
| 2012/0150771 A1 | 6/2012 | Kasneci et al. |
| 2012/0253825 A1 | 10/2012 | Di Fabbrizio et al. |
| 2013/0007055 A1 | 1/2013 | Brown et al. |
| 2013/0018652 A1 | 1/2013 | Ferrucci et al. |
| 2013/0060756 A1 | 3/2013 | White et al. |
| 2013/0066886 A1 | 3/2013 | Bagchi et al. |
| 2013/0226852 A1 | 8/2013 | Brillhart et al. |
| 2013/0262453 A1 | 10/2013 | Lin et al. |
| 2013/0282698 A1 | 10/2013 | Oztekin et al. |
| 2013/0325779 A1 | 12/2013 | Shahshahani et al. |
| 2014/0087355 A1 | 3/2014 | Henry et al. |
| 2014/0229164 A1 | 8/2014 | Martens et al. |
| 2015/0088906 A1 | 3/2015 | Pal et al. |
| 2015/0120718 A1 | 4/2015 | Luo et al. |
| 2015/0161230 A1 | 6/2015 | Alkov et al. |
| 2015/0161512 A1 | 6/2015 | Byron et al. |
| 2015/0161513 A1 | 6/2015 | Li et al. |
| 2015/0193429 A1 | 7/2015 | Bohra et al. |
| 2015/0254785 A1 | 9/2015 | Yang et al. |
| 2016/0034512 A1 | 2/2016 | Singhal et al. |
| 2017/0213178 A1 | 7/2017 | Todd et al. |

OTHER PUBLICATIONS

Arnold, Vicky et al., "The Differential Use and Effect of Knowledge-Based System Explanations in Novice and Expert Judgment Decisions", (2006) MIS Quarterly vol. 30, No. 1 (Mar. 2006), pp. 79-97.

Cawsey, Alison, "User Modelling in Interactive Explanations", User Modeling and User-Adapted Interaction, vol. 3, No. 3, Sep. 1, 1993, pp. 221-247.

Chen, Lin et al., "Expertise Analysis in a Question Answer Portal for Author Ranking", 2008 IEEE/WIC/ACM International Conference on Web intelligence and Intelligent Agent Technology, DOI 10.1109/WIIAT.2008.12 (Year 2008), Dec. 9-12, pp. 134-140.

Chu-Carroll, Jennifer, "MIMC: An Adaptive Mixed Initiative Spoken Dialogue System for Information Queries", Proceedings of The North American Chapter of the Association for Computational Linguistics, NAACL '00, Apr. 29-May 4, 2000, 8 pages.

Gondek, D.C. et al., "A framework for merging and ranking of answers in DeepQA", International Business Machines Corporation, IBM Journal of Research & Development, vol. 56 No. 3/4, Paper 14, May/Jul. 2012, pp. 14:1-14:12.

Hahn, Udo, "An Annotation Type System for a Data-Driven NLP Pipeline", Association for Computational Linguistics, Proceedings of the Linguistic Annotation Workshop, Jun. 2007, pp. 33-40.

Harabagiu, Sanda et al., "Strategies for Advanced Question Answering", Human Language Technology conference / North American chapter of the Association for Computational Linguistics annual meeting, HLT/NAACL '04, May 2-7, 2004, 9 pages.

High, Rob, "The Era of Cognitive Systems: An Inside Look at IBM Watson and How it Works", IBM Corporation, Redbooks, Dec. 12, 2012, 16 pages.

Jokinen, Kristiina et al., "User Expertise Modelling and Adaptivity in a Speech-Based E-Mail System", ACL '04 Proceedings of the 42nd Annual Meeting on Association for Computational Linguistics, Jul. 21-26, 2004, 8 pages.

Jurczyk, Pawel et al., "Discovering Authorities in Question Answer Communities by Using Link Analysis", (Nov. 2007), In Proceedings of the 16th ACM Conference on Information and Knowledge Management, ACM DOI: 10.1145/1321440.1321575, (Year 2007) pp. 919-922.

Nielsen, Rodney D. et al., "An Architecture for Complex Clinical Question Answering", ACM, Proceedings of the 1st ACM International Health Informatics Symposium, Nov. 2010, pp. 395-399.

Paris, Cecile, "Determining the Level of Expertise of a User of a Question Answering System", Defense Advanced Research Projects Agency, DARPA contract N00039-82-C-427, Mar. 1984, 10 pages.

Paris, Cécile L., "Generation and Explanation: Building an Explanation Facility for the Explainable Expert Systems Framework", Natural Language Generation in Artificial Intelligence and Computational Linguistics, Chapter 2, (month unknown) 1991, pp. 49-82.

Paris, Cécile L., "Tailoring Object Descriptions to a User's Level of Expertise", Computational Linguistics, vol. 14, No. 3, Sep. 1988, 15 pages.

Paris, Cécile L., "The Use of Explicit User Models in a Generation System for Tailoring Answers to the User's Level of Expertise", User Models in Dialog Systems, Chapter 8, 1989, pp. 200-232.

Suryanto, Maggy A. et al., "Quality-Aware Collaborative Question Answering: Methods and Evaluation", ACM, Proceedings of the second ACM international conference on web search an data mining, WSDM'09, Barcelona, Spain, Feb. 2009, pp. 142-151.

Wang, Haochang et al., "Biomedical Named Entity Recognition Based on Classifiers Ensemble", Technomathematics Research Foundation, International Journal of Computer Science and Applications (IJCSA), vol. 5, No. 2, 2008, 11 pages.

Yang, Baoguo et al., "Exploring User Expertise and Descriptive Ability in Community Question Answering", IEEE, 2014 IEEE/ACM International Conference on Advances in Social Networks Analysis and Mining (ASONAM 2014), Beijing, China, Aug. 17-20, 2014, pp. 320-327.

Yuan, Michael J., "Watson and healthcare, How natural language processing and semantic search could revolutionize clinical decision support", IBM Corporation, IBM developerWorks, http://www.ibm.com/developerworks/industry/library/ind-watson/, Apr. 12, 2011, 14 pages.

Zhang, Jun et al., "Expertise Networks in Online Communities: Structure and Algorithms", Jun Zhang, Mark S. Ackerman and Lada Adamic, (May 2007), In Proceedings of the 16th International Conference on World Wide Web; ACM (Year 2007) pp. 221-230.

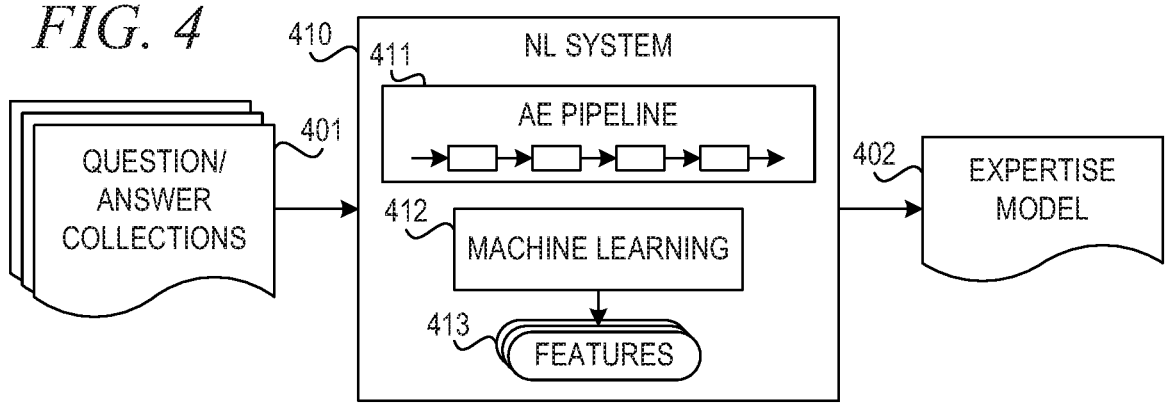
FIG. 4
FIG. 6
| QUESTION ID | ANSWERS ID | EXPERTISE-LEVEL |
|---|---|---|
| 1 | 1A | 1 |
| 1 | 1B | 2 |
| 1 | 1C | 0 |
| 2 | 2A | 1 |
| 2 | 2B | 0 |
| 2 | 2C | 3 |
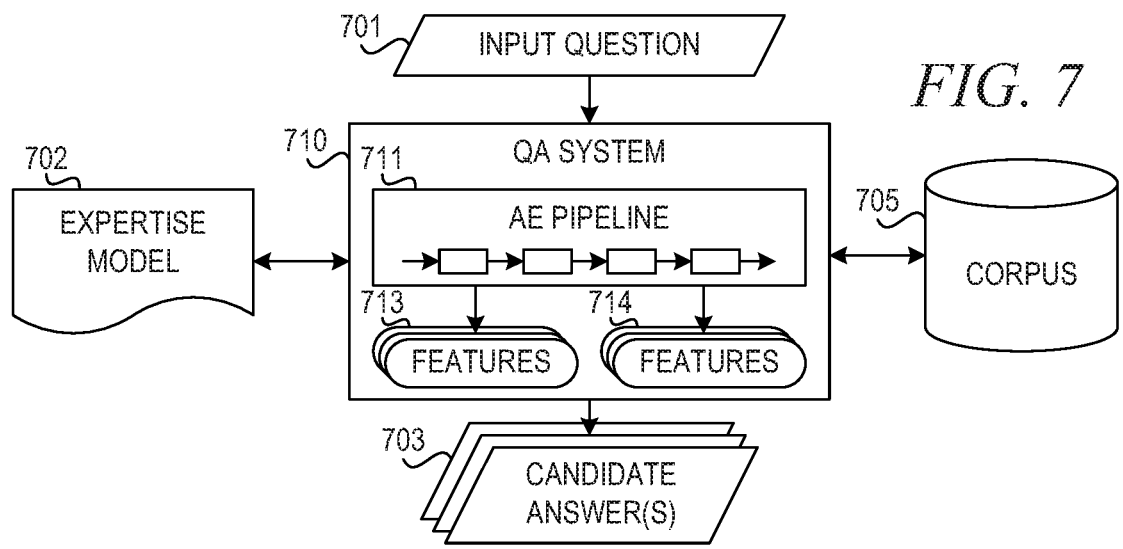
FIG. 7

*FIG. 5*

 Jared
Member for 18 months.

QUESTION:

Computer shuts itself down?

After using computers for over 20 years ,my computer just shut itself down twice today, and I'm having trouble identifying the cause. The first time it seemed like it suddenly had no power, but the light on the power button stayed on. It has done this before, but then it seemed to crash, because the speakers kept stuttering with the sound of the video i was watching. The second time I had no audio so I don't know if it was the same case this time. Is this a virus, or could it be that it shut itself down to protect itself from overheating?

ANSWERS:

 Scout (moderator)
Member for 3 years.

8 FOUND THIS HELPFUL

One possible cause is overheating. When was the last time you opened up the case and blew the dust out? The dust can cause various parts to overheat and kick in fail-safes that would give some of the issues you are describing.

Depending on the age, the RAM might be going bad. I'm actually having some of the same issues because of faulty RAM.

I recommend you install antivirus and anti-malware. Once installed, just run a full system scan in both programs. Both can be running at the same time, that shouldn't be a problem.

 Fred
Member for 2 months.

1 FOUND THIS HELPFUL

I think you need a expert to ..
the causes to that as :
the most probability: the System, RAMs, dust on radiator, bad radiator, bad dough ( on cpu );
far probability: filtering capacitors; the thermal IC, some component on PCB.

 Mike
Member for 6 months.

0 FOUND THIS HELPFUL

Change The Window
Remove Unnecessary Programs
Don't Install More The One OS.

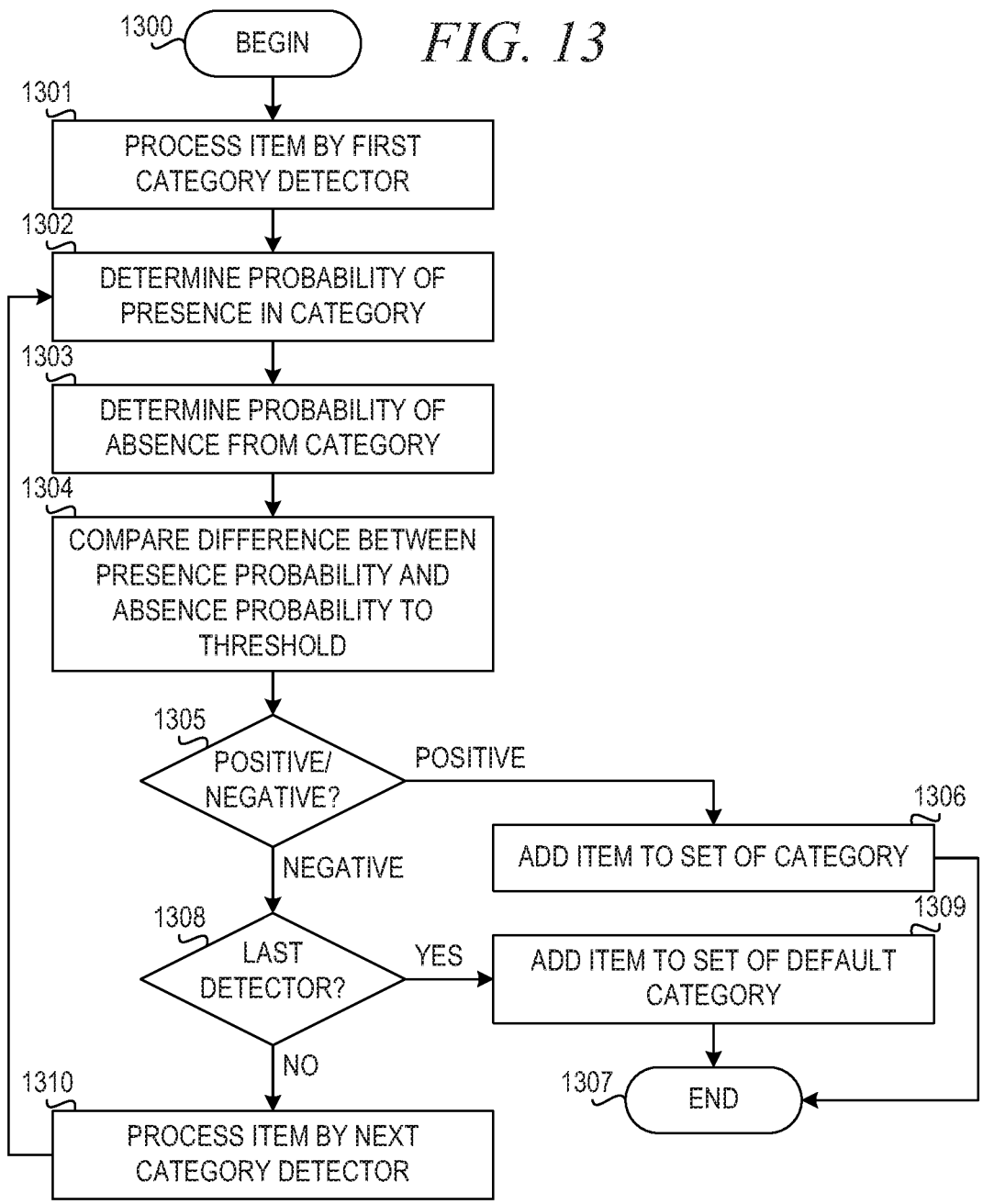

TAILORING QUESTION ANSWERING SYSTEM OUTPUT BASED ON USER EXPERIENCE

BACKGROUND

The present application relates generally to an improved data processing apparatus and method and more specifically to mechanisms for tailoring question answering system output based on user expertise.

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating Question and Answer (QA) systems, which may take an input question, analyze it, and return results indicative of the most probable answer to the input question. QA systems provide automated mechanisms for searching through large sets of sources of content, e.g., electronic documents, and analyze them with regard to an input question to determine an answer to the question and a confidence measure as to how accurate an answer is for answering the input question.

One such QA system is the IBM Watson™ system available from International Business Machines (IBM) Corporation of Armonk, N.Y. The IBM Watson™ system is an application of advanced natural language processing, information retrieval, knowledge representation and reasoning, and machine learning technologies to the field of question answering. The IBM Watson™ system is built on IBM's DeepQA™ technology used for hypothesis generation, massive evidence gathering, analysis, and scoring. DeepQA™ takes an input question, analyzes it, decomposes the question into constituent parts, generates one or more hypotheses based on the decomposed question and results of a primary search of answer sources, performs hypothesis and evidence scoring based on a retrieval of evidence from evidence sources, performs synthesis of the one or more hypotheses, and based on trained models, performs a final merging and ranking to output an answer to the input question along with a confidence measure.

Various United States Patent Application Publications describe various types of question and answer systems. U.S. Patent Application Publication No. 2011/0125734 discloses a mechanism for generating question and answer pairs based on a corpus of data. The system starts with a set of questions and then analyzes the set of content to extract answer to those questions. U.S. Patent Application Publication No. 2011/0066587 discloses a mechanism for converting a report of analyzed information into a collection of questions and determining whether answers for the collection of questions are answered or refuted from the information set. The results data are incorporated into an updated information model.

SUMMARY

In one illustrative embodiment, a method, in a data processing system, is provided for tailoring question answering system output based on user expertise. The method comprises receiving an input question from a questioning user and determining a set of features associated with text of the input question. The method further comprises determining an expertise level of the questioning user based on the set of features associated with the text of the input question using a trained expertise model. The method further comprises generating one or more candidate answers for the input question and tailoring output of the one or more candidate answers based on the expertise level of the questioning user.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 4 is a block diagram illustrating a mechanism for training a system for characteristic levels in accordance with an illustrative embodiment;

FIG. 5 depicts an example of a question/answer collection in accordance with an embodiment;

FIG. 6 is a table showing examples of labeled examples of questions and answers with predetermined expertise levels in accordance with an illustrative embodiment;

FIG. 7 is a block diagram of a question answering system with output tailored to expertise level in accordance with an illustrative embodiment;

FIG. 13 is a flowchart illustrating operation of a serial detection model for classifying input text into user characteristic levels in accordance with an illustrative embodiment.

DETAILED DESCRIPTION

Figure 1:
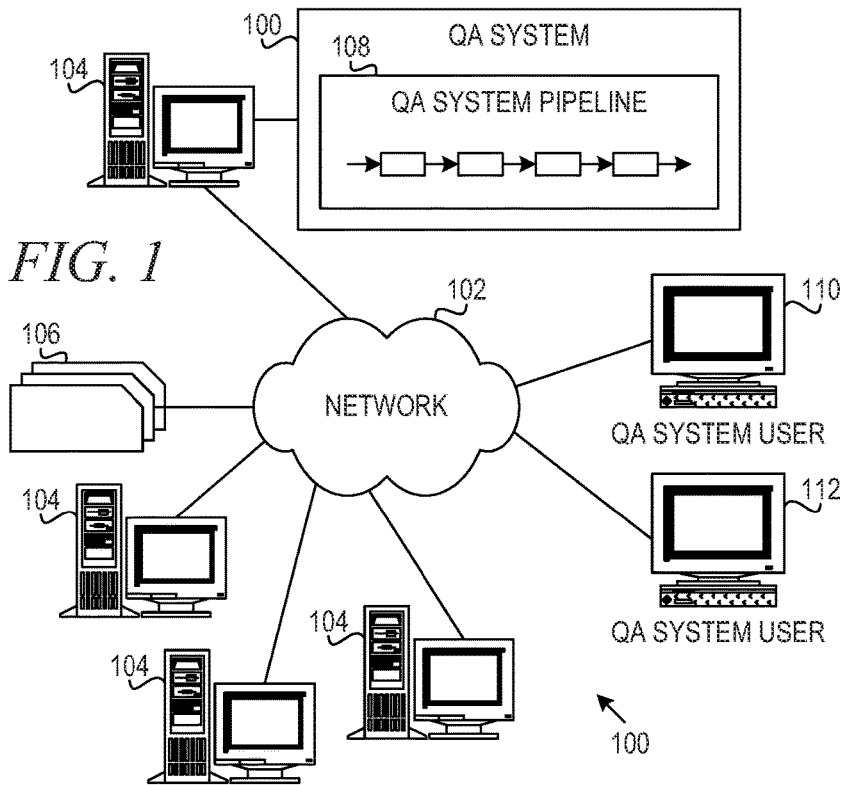
FIG. 1 depicts a schematic diagram of one illustrative embodiment of a question/answer creation (QA) system in a computer network.

The illustrative embodiments provide a mechanism to maintain multiple answers for a question answering system. In many domain-specific question answering scenarios, users may have varying levels of domain expertise. The one-size-fits-all model of providing uniform answer content to questions may not be best suited for systems with a wide range of user expertise levels. This is particularly true in scenarios such as customer support and call-center support applications. For example, a system administrator for a large company may call requesting help diagnosing an error with Domain Name System (DNS) access. It would not be a good strategy to provide this user with the same answer as one would give a residential customer of an Internet Service Provider (ISP) who has limited Internet trouble-shooting experience.

Producing differential system behavior based on user attributes is referred to as tailoring. One can display tailoring in a variety of ways depending on which system components are modified. Tailoring can be used to produce different surface realizations (e.g., choosing to use layperson vocabulary vs. technical jargon), to choose a well-suited starting point when describing a process for solving a problem, or different information packaging strategies (how much granularity of information to incorporate in each system output). Tailoring has been used successfully for both tutorial/educational systems and spoken dialog interfaces for information browsers. Tailoring answer content can lead not only to increased user satisfaction, learning gains, and task success, but also deepen user engagement with the interaction, so that they spend more time interacting with the system, and thereby receive more benefit from the system.

Prior solutions have two limitations. First, prior solutions either provide user expertise levels explicitly (e.g., in an educational software/tutorial system scenario) or observe user expertise levels by collecting system-internal measures, such as how quickly the user is making progress towards a solution. This requires having some amount of experience with the user before an expertise determination can be made, but that requirement may not hold in some use cases, such as a customer service question answering system. A second drawback of prior solutions is that the system resources that support differential system behavior are often hand crafted and hand-tagged as to which system response is appropriate for which user behavior.

An illustrative embodiment provides a mechanism for inferring the expertise level of the user from the user's question. The mechanism uses the expertise level of the user to tailor the answers produced by a question answering system or in some other usage scenario. The mechanism learns a model of the continuum of user expertise levels for a domain, using human-to-human dialog examples harvested from online question and answer collections, such as frequently asked question documents (FAQs), threaded discussions, question and answer aggregation sites, and company-internal resources such as message boards, etc. The mechanism then compares user inputs at runtime to the collected information in order to tailor system behaviors based on similarity with observed human behavior in the learned model.

A "mechanism," as used herein, may be an implementation of the functions or aspects of the illustrative embodiments in the form of an apparatus, a procedure, or a computer program product. The mechanisms described herein may be implemented as specialized hardware, software executing on general purpose hardware, software instructions stored on a medium such that the instructions are readily executable by specialized or general purpose hardware, a procedure or method for executing the functions, or a combination of the above.

The above aspects and advantages of the illustrative embodiments of the present invention will be described in greater detail hereafter with reference to the accompanying figures. It should be appreciated that the figures are only intended to be illustrative of exemplary embodiments of the present invention. The present invention may encompass aspects, embodiments, and modifications to the depicted exemplary embodiments not explicitly shown in the figures but would be readily apparent to those of ordinary skill in the art in view of the present description of the illustrative embodiments.

Figure 2:
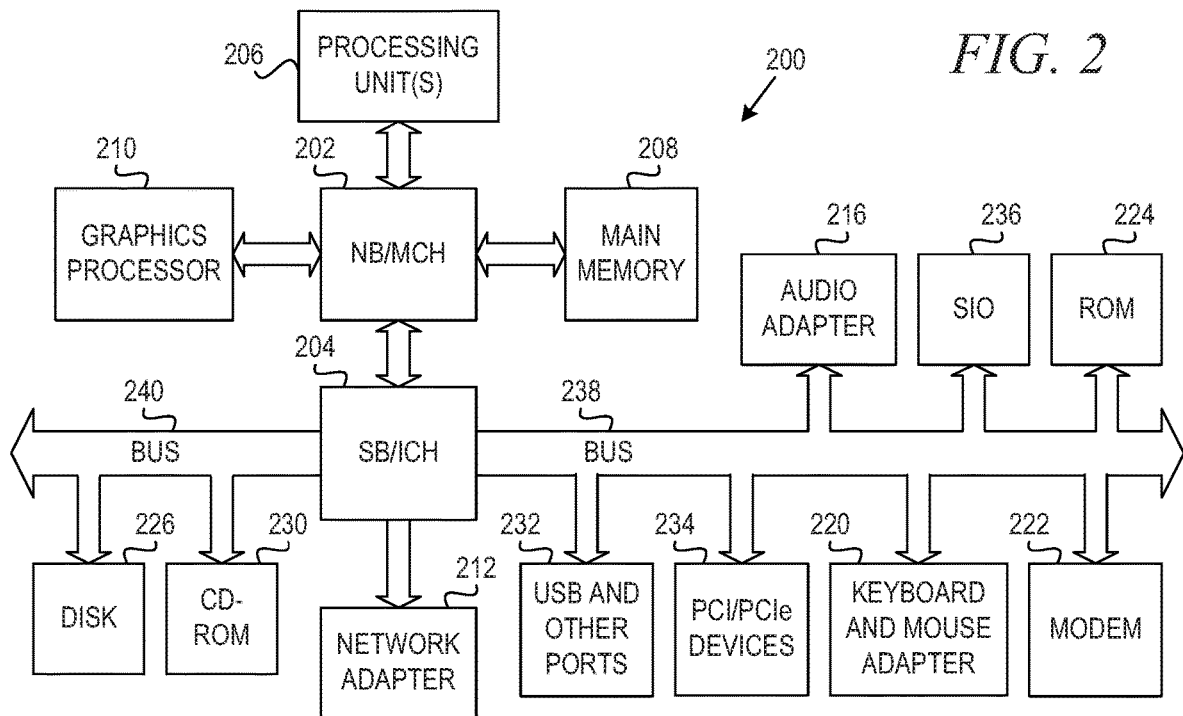
FIG. 2 is a block diagram of an example data processing system in which aspects of the illustrative embodiments may be implemented.
Figure 3:
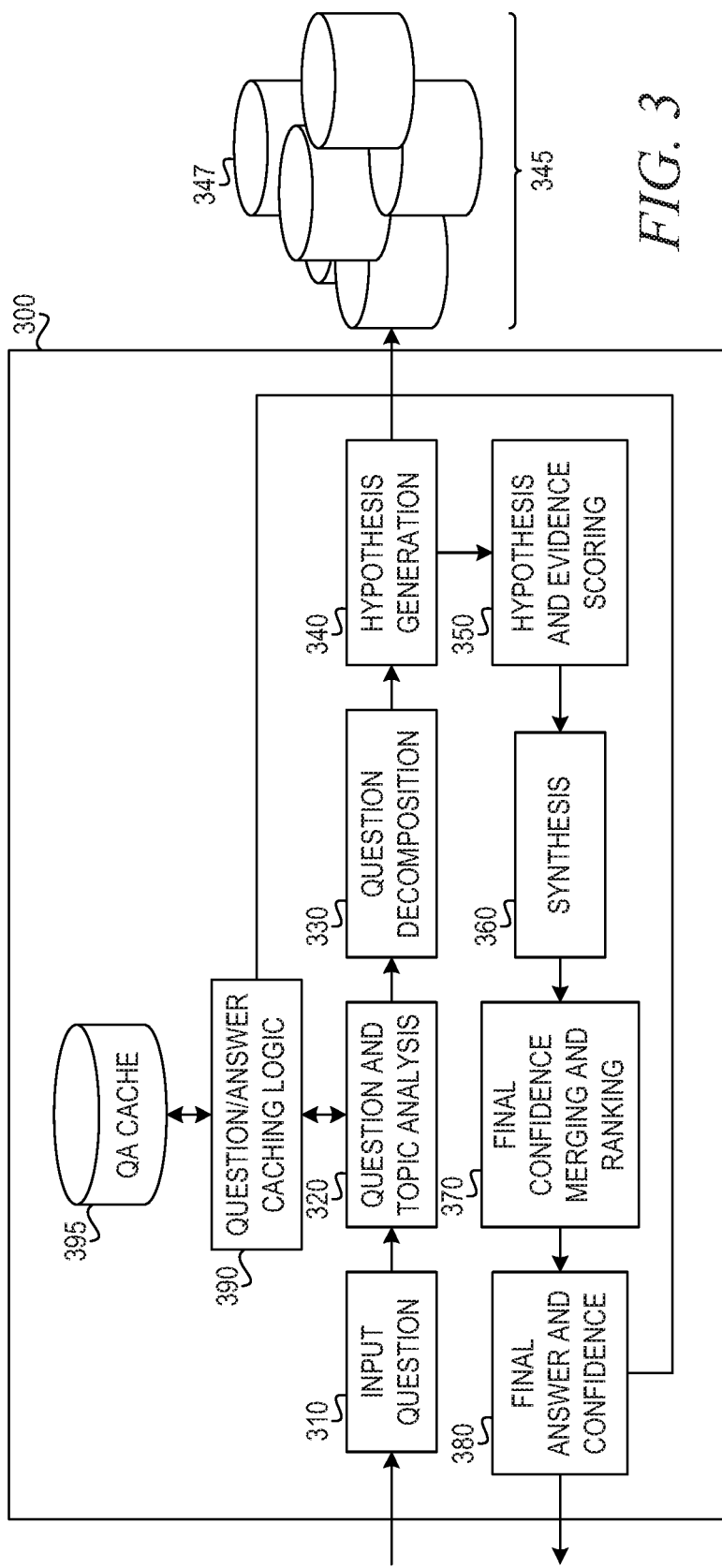
FIG. 3 illustrates a QA system pipeline for processing an input question in accordance with one illustrative embodiment.

FIGS. 1-3 are directed to describing an example Question/Answer, Question and Answer, or Question Answering (QA) system, methodology, and computer program product with which the mechanisms of the illustrative embodiments may be implemented. As will be discussed in greater detail hereafter, the illustrative embodiments may be integrated in, and may augment and extend the functionality of, these QA mechanisms with regard to automatically generating testing/training questions and answers by performing pattern based analysis and natural language processing techniques on the given corpus for quick domain adaptation.

Thus, it is important to first have an understanding of how question and answer creation in a QA system may be implemented before describing how the mechanisms of the illustrative embodiments are integrated in and augment such QA systems. It should be appreciated that the QA mechanisms described in FIGS. 1-3 are only examples and are not intended to state or imply any limitation with regard to the type of QA mechanisms with which the illustrative embodiments may be implemented. Many modifications to the example QA system shown in FIGS. 1-3 may be implemented in various embodiments of the present invention without departing from the spirit and scope of the present invention.

QA mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e., candidate answers.

Content creators, such as article authors, electronic document creators, web page authors, document database creators, and the like, determine use cases for products, solutions, and services described in such content before writing their content. Consequently, the content creators may know what questions the content is intended to answer in a particular topic addressed by the content. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA system. Content creators, automated tools, or the like, annotate or otherwise generate metadata for providing information useable by the QA system to identify these question-and-answer attributes of the content.

Operating on such content, the QA system generates answers for input questions using a plurality of intensive analysis mechanisms, which evaluate the content to identify the most probable answers, i.e., candidate answers, for the input question. The illustrative embodiments leverage the work already done by the QA system to automatically generate testing/training questions and answers by performing pattern based analysis and natural language processing techniques on the given corpus for quick domain adaptation.

FIG. 1 depicts a schematic diagram of one illustrative embodiment of a question/answer creation (QA) system 100 in a computer network 102. One example of a question/answer generation which may be used in conjunction with the principles described herein is described in U.S. Patent Application Publication No. 2011/0125734, which is herein incorporated by reference in its entirety. The QA system 100 may be implemented on one or more computing devices 104 (comprising one or more processors and one or more memories, and potentially any other computing device elements generally known in the art including buses, storage devices, communication interfaces, and the like) connected to the computer network 102. The network 102 includes multiple computing devices 104 in communication with each other and with other devices or components via one or more wired and/or wireless data communication links, where each communication link comprises one or more of wires, routers, switches, transmitters, receivers, or the like. The QA system 100 and network 102 enable question/answer (QA) generation functionality for one or more QA system users via their respective computing devices 110, 112. Other embodiments of the QA system 100 may be used with components, systems, sub-systems, and/or devices other than those that are depicted herein.

The QA system 100 may be configured to implement a QA system pipeline 108 that receive inputs from various sources. For example, the QA system 100 may receive input from the network 102, a corpus of electronic documents 106, QA system users, or other data and other possible sources of input. In one embodiment, some or all of the inputs to the QA system 100 is routed through the network 102. The various computing devices 104 on the network 102 include access points for content creators and QA system users. Some of the computing devices 104 include devices for a database storing the corpus of data 106 (which is shown as a separate entity in FIG. 1 for illustrative purposes only). Portions of the corpus of data 106 may also be provided on one or more other network attached storage devices, in one or more databases, or other computing devices not explicitly shown in FIG. 1. The network 102 includes local network connections and remote connections in various embodiments, such that the QA system 100 may operate in environments of any size, including local and global, e.g., the Internet.

In one embodiment, the content creator creates content in a document of the corpus of data 106 for use as part of a corpus of data with the QA system 100. The document includes any file, text, article, or source of data for use in the QA system 100. QA system users access the QA system 100 via a network connection or an Internet connection to the network 102, and input questions to the QA system 100 to be answered by the content in the corpus of data 106. In one embodiment, the questions are formed using natural language. The QA system 100 interprets the question and provide a response to the QA system user, e.g., QA system user 110, containing one or more answers to the question. In some embodiments, the QA system 100 provides a response to users in a ranked list of candidate answers.

The QA system 100 implements a QA system pipeline 108, which comprises a plurality of stages for processing an input question, the corpus of data 106, and generating answers for the input question based on the processing of the corpus of data 106. The QA system pipeline 108 will be described in greater detail hereafter with regard to FIG. 3.

In some illustrative embodiments, the QA system 100 may be the IBM Watson™ QA system available from International Business Machines Corporation of Armonk, N.Y., which is augmented with the mechanisms of the illustrative embodiments described hereafter. The IBM Watson™ QA system receives an input question, which it then parses to extract the major features of the question, which in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms look at the matching of terms and synonyms within the language of the input question and the found portions of the corpus of data. Other reasoning algorithms look at temporal or spatial features in the language, while others evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model is then used to summarize a level of confidence that the IBM Watson™ QA system has regarding the evidence that the potential response, i.e., candidate answer, is inferred by the question. This process is repeated for each of the candidate answers until the IBM Watson™ QA system identifies candidate answers that surface as being significantly stronger than others and thus, generates a final answer, or ranked set of answers, for the input question. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

FIG. 2 is a block diagram of an example data processing system in which aspects of the illustrative embodiments may be implemented. Data processing system 200 is an example of a computer, such as server 104 or client 110 in FIG. 1, in which computer usable code or instructions implementing the processes for illustrative embodiments of the present invention may be located. In one illustrative embodiment, FIG. 2 represents a server computing device, such as a server 104, which, which implements a QA system 100 and QA system pipeline 108 augmented to include the additional mechanisms of the illustrative embodiments described hereafter.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 is connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 use, for example, an integrated drive electronics (IDE) or serial advanced technology attachment (SATA) interface. Super I/O (SIO) device 236 is connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 illustrates a QA system pipeline for processing an input question in accordance with one illustrative embodiment. The QA system pipeline of FIG. 3 may be implemented, for example, as QA system pipeline 108 of QA system 100 in FIG. 1. It should be appreciated that the stages of the QA system pipeline shown in FIG. 3 may be implemented as one or more software engines, components, or the like, which are configured with logic for implementing the functionality attributed to the particular stage. Each stage may be implemented using one or more of such software engines, components or the like. The software engines, components, etc. may be executed on one or more processors of one or more data processing systems or devices and may utilize or operate on data stored in one or more data storage devices, memories, or the like, on one or more of the data processing systems. The QA system pipeline of FIG. 3 may be augmented, for example, in one or more of the stages to implement the improved mechanism of the illustrative embodiments described hereafter, additional stages may be provided to implement the improved mechanism, or separate logic from the pipeline 300 may be provided for interfacing with the pipeline 300 and implementing the improved functionality and operations of the illustrative embodiments.

As shown in FIG. 3, the QA system pipeline 300 comprises a plurality of stages 310-380 through which the QA system operates to analyze an input question and generate a final response. In an initial question input stage 310, the QA system receives an input question that is presented in a natural language format. That is, a user may input, via a user interface, an input question for which the user wishes to obtain an answer, e.g., "Who are Washington's closest advisors?" In response to receiving the input question, the next stage of the QA system pipeline 300, i.e. the question and topic analysis stage 320, parses the input question using natural language processing (NLP) techniques to extract major features from the input question, classify the major features according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

The identified major features are then used during the question decomposition stage 330 to decompose the question into one or more queries to be applied to the corpora of data/information 345 in order to generate one or more hypotheses. The queries are generated in any known or later developed query language, such as the Structure Query Language (SQL), or the like. The queries are applied to one or more databases storing information about the electronic texts, documents, articles, websites, and the like, that make up the corpora of data/information 345. That is, these various sources themselves, different collections of sources, and the like, represent a different corpus 347 within the corpora 345.

There may be different corpora 347 defined for different collections of documents based on various criteria depending upon the particular implementation. For example, different corpora may be established for different topics, subject matter categories, sources of information, or the like. As one example, a first corpus is associated with healthcare documents while a second corpus is associated with financial documents. Alternatively, one corpus comprises documents published by the U.S. Department of Energy while another corpus comprises IBM Redbooks documents. Any collection of content having some similar attribute is considered to be a corpus 347 within the corpora 345.

As used herein, a "domain" is a technical, professional, or academic field having a corresponding corpus or source of information. For instance, one domain is a healthcare domain where a corresponding corpus for the domain includes healthcare documents and another domain is a financial domain where a corresponding corpus for the financial domain is a collection of financial documents.

The queries are applied to one or more databases storing information about the electronic texts, documents, articles, websites, and the like, that make up the corpus of data/information, e.g., the corpus of data 106 in FIG. 1. The queries being applied to the corpus of data/information at the hypothesis generation stage 340 to generate results identifying potential hypotheses for answering the input question which can be evaluated. That is, the application of the queries results in the extraction of portions of the corpus of data/information matching the criteria of the particular query. These portions of the corpus are then be analyzed and used, during the hypothesis generation stage 340, to generate hypotheses for answering the input question. These hypotheses are also referred to herein as "candidate answers" for the input question. For any input question, at this stage 340, there may be hundreds of hypotheses or candidate answers generated that need to be evaluated.

The QA system pipeline 300, in stage 350, then performs a deep analysis and comparison of the language of the input question and the language of each hypothesis or "candidate answer" as well as performs evidence scoring to evaluate the likelihood that the particular hypothesis is a correct answer for the input question. As mentioned above, this may involve using a plurality of reasoning algorithms, each performing a separate type of analysis of the language of the input question and/or content of the corpus that provides evidence in support of, or not, of the hypothesis. Each reasoning algorithm generates a score based on the analysis it performs, which indicates a measure of relevance of the individual portions of the corpus of data/information extracted by application of the queries as well as a measure of the correctness of the corresponding hypothesis, i.e., a measure of confidence in the hypothesis.

In the synthesis stage 360, the many relevance scores generated by the various reasoning algorithms are synthesized into confidence scores for the various hypotheses. This process involves applying weights to the various scores, where the weights have been determined through training of the statistical model employed by the QA system and/or dynamically updated, as described hereafter. The weighted scores are processed in accordance with a statistical model generated through training of the QA system that identifies a manner by which these scores are combined to generate a confidence score or measure for the individual hypotheses or candidate answers. This confidence score or measure summarizes the level of confidence that the QA system has about the evidence that the candidate answer is inferred by the input question, i.e., that the candidate answer is the correct answer for the input question.

The resulting confidence scores or measures are processed by a final confidence merging and ranking stage 370 which compares the confidence scores and measures, compare them against predetermined thresholds, or perform any other analysis on the confidence scores to determine which hypotheses/candidate answers are the most likely to be the answer to the input question. The hypotheses/candidate answers are ranked according to these comparisons to generate a ranked listing of hypotheses/candidate answers (hereafter simply referred to as "candidate answers"). From the ranked listing of candidate answers, at stage 380, a final answer and confidence score, or final set of candidate answers and confidence scores, are generated and output to the submitter of the original input question.

After stage 380, or as part of stage 380, the set of candidate answers is output via a graphical user interface, which provides the user with tools for collaborating with the QA system to review, evaluate, and modify the listing of candidate answers and the evidence associated with these candidate answers that is evaluated by the QA system. That is, at stage 390, the graphical user interface engine not only receives the final ranked listing of candidate answers generated by the QA system pipeline 300, but also receives the underlying evidence information for each of the candidate answers from the hypothesis and evidence scoring stage 350, and uses this information to generate a graphical user interface outputting the ranked listing of candidate answers and an output of the selected portions of the corpus of data/information that supports, and/or detracts, from the candidate answers being the correct answer for the input question, referred to hereafter as the "evidence passages." Stage 390 may also cache candidate answers and evidence in QA cache 395 to more quickly provide answers and supporting evidence for recently or frequently asked questions.

In previous implementations, the QA system assumes all users are expert users. This assumption holds in many use cases that are practitioner-facing, such as in-clinic medical support systems, municipal debt quality analysis, insurance company policy review, etc. However, this assumption may prove to be in appropriate for customer-facing applications and other uses in the education or training space.

The illustrative embodiments utilize a finding from tutorial and dialog systems that calibrating system output to the user's expertise level leads to better system success. Success is measured in terms of higher learning gains achieved, higher user satisfaction, and increased user engagement and enjoyment. However, prior implementations rely on hand-crafted resources in order to tailor system behaviors. For example, a tutorial system may hand-code three different phrasings of a question to be presented to the student based on his current level of beginner/intermediate/advanced. Also, prior implementations tend to rely on user-specific attributes pulled from each other's interaction with the system to assess the user's expertise level. In many tutorial situations, the student's expertise level is known and input by the instructor. Other more sophisticated models infer the user's expertise level based on some aspect of their interaction with the current system, such as the number of times the user has used the system or how fast the user makes progress toward a goal.

The illustrative embodiments provide a mechanism for driving differential system behavior in a more automated way through supervised learning of an expertise model built from passively collected human-to-human interactions. An advantage of this model is that it is broadly applicable to any domain for which question and answer collections can be harvested. Also, the mechanism assesses the expertise level based on a similarity measure between a current user and examples in the harvested corpus. Therefore, the system does not need to have a lot of interaction with a particular user in order to gauge expertise level.

FIG. 4 is a block diagram illustrating a mechanism for training a system for characteristic levels in accordance with an illustrative embodiment. While the illustrative embodiments are depicted with respect to expertise level, the illustrative embodiments may also apply to other characteristic levels, such as language fluency, urgency level, or frustration level, for example. The illustrative embodiments may apply to any characteristic levels that can be categorized and can be inferred from the language of a question or other input.

Natural language (NL) system 410 harvests questions and answers from question/answer collections 401, which may include FAQ documents, threaded discussions between users, question/answer aggregation sites, email questions sent to a customer service department, online forum posts, customer service chats, or any other format where domain-specific questions/responses are collected. Natural language processing (NLP) is a field of computer science, artificial intelligence, and linguistics concerned with the interactions between computers and human (natural) languages. As such, NLP is related to the area of human-computer interaction. Many challenges in NLP involve natural language understanding, that is, enabling computers to derive meaning from human or natural language input, and others involve natural language generation. Thus, NL system 410 is a system that processes human input in a natural language to derive meaning and understanding on some level. In one particular embodiment, NL system 410 is a question answering (QA) system as described above and with reference to FIG. 7 below; however, NL system 410 need not be the same system as QA system 710 shown in FIG. 7 and described below.

In one embodiment, each post of the question/answer collections 401 is labeled as a question or an answer and each post is paired with a persistent user identification (ID), such as a user handle, email address, customer account number, etc. N L system 410 processes the examples from question/answer collections 401 using annotation engine pipeline 411 to extract features 413 from the questions and answers. In an example embodiment, AE pipeline 411 extracts the following features 413 from each question or answer in order to determine the expertise level of a user posing a question (i.e., the questioning user) as well as the expertise level of users identified with potential answers to the question:

content words formed into unigram/ngram lexical features;

social hedges, such as words that indicate uncertainty (e.g., "I'm not sure but" or "I think that");

specificity of words (e.g., "I'm having trouble printing" is generic and "error on sysout statement" is more specific and technical);

specific experience level indicators (e.g., "my first post," "newbie," "superuser," "using Java for four years," "never had this problem before," etc.); and references to external expertise, such as product documentation, system log messages, or attached log files indicate a higher amount of user expertise.

NL system 410 also processes question/answer collections 401 to extract features 413 from each particular user's posting history. For example, a user may ask a question in an online forum and may also have contributed several answers in the same online forum. The user may also use the same user ID in multiple question/answer aggregation sites. Thus, NL system 410 uses AE pipeline 411 to extract features, such as those referenced above, from the user's posting history. For example, NL system 410 extracts over what time-span the user has participated in the forum based on a date of the user's first post. NL system 410 also extracts what percentage of the user's posts are questions versus answers. NL system 410 extracts and stores these features 413 for a plurality of users making posts.

FIG. 5 depicts an example of a question/answer collection in accordance with an embodiment. In the depicted example, a questioning user, Jared, asks a question of a support forum of which the questioning user is a member. In particular, as shown in the example, the questioning user has been a member of the support forum for eighteen months. The length of membership in the support forum is one feature that can be extracted for determining expertise. A user who has been a member for a long period of time will have seen more issues raised, addressed, and solved than users who have been members for a short period of time. As mentioned above, NL system 410 may alternatively determine the length of membership based on a date of the questioning user's first post in the support forum.

In the text of the question, the questioning user mentions using computers for over twenty years. AE pipeline 411 includes annotation engines that perform processes to generate features, such as identifying time values, annotating parts of speech, etc. Each annotation engine in AE pipeline 411 may receive features from or provide features to other annotation engines. Thus, combinations of annotation engines within AE pipeline 411 are capable of generating more complex features, such as understanding that the questioning user has used computers for over twenty years. In this case, the feature of the length of time the user has been using computers is a specific experience level indicator, because a user who has used computers for a long period of time relative to other users may have a high level of expertise in the field of computers.

Also, in the depicted, example, AE pipeline 411 may identify "I don't know" and "I'm having trouble identifying the cause" as social hedges. AE pipeline 411 may also identify "I'm having trouble identifying the cause" as a phrase having a lack of specificity.

The question/answer collection depicted in FIG. 5 also includes a plurality of answers to the question. One user, Scout, provides an answer to the question asked by Jared. This user is identified as a moderator of the support forum, which is a specific experience level indicator. The answer provided by the user, Scout, includes content words with specificity, such as "fail-safes," "antivirus," "anti-malware," and "full system scan." For example, the question includes an acronym, RAM, without expanding the acronym. This indicates that the user assumes the reader has a particular expertise level, which itself is an expertise level indicator.

Also shown in the question/answer collection depicted in FIG. 5, each given answer has a count of the number of other users who found the given answer helpful. Many online forums, message boards, social media sites, and the like have mechanisms that allow users to concur with the answer, e.g., "like," "thanks," "vote," "thumbs up," etc. A high number of consent indicators, such as the "found this helpful" number shown in FIG. 5, is a feature that contributes to determining expertise level.

The example question/answer collection of FIG. 5 includes an answer by a user, Fred that includes features that would contribute to determining a low expertise level. For instance, Fred has been a member of the support forum for a short period of time relative to the other users. In addition, the answer includes incomplete sentences, improper punctuation, and poor organization of ideas. While the answer provided by the user includes phrases with high specificity (e.g., system, RAM, radiator, CPU, filtering capacitors, thermal IC, PCB), the concepts are unrelated, leading to vagueness or lack of focus. The answer also has a low indicator of consent, because only one other user found the answer helpful.

The depicted example includes yet another answer by a user, Mike, which NL system 410 may determine has a low probability of being a correct answer. This answer consists of incomplete sentences, which have a low likelihood of conveying useful ideas. Also, no other users found the answer to be helpful. In one embodiment, NL system 410 may run the question and the answer through a question answering (QA) system, such as the QA system shown in FIGS. 1, 3, and 7, to determine a confidence score associated with the answer. A low confidence score indicates a low probability that the answer is correct.

Returning to FIG. 4, NL system 410 also processes question/answer collections 401 to extract features 413 from other users' evaluations of or responses to each particular user's posting history. For example, NL system 410 uses AE pipeline 411 to extract, if available, the user's expertise level as assessed by other forum members on the current or other prior answers provided by the same contributor. For instance, a given user, such as Scout in FIG. 5, may provide several answers in the question/answer collections 401 after which other users reply with consent, such as "I agree with Scout," "that's what I was thinking," etc. As described above, the question/answer aggregation site also may allow users to give votes, likes, thank you indicators, thumbs up/down, etc. NL system 410 extracts this information as a feature contributing to expertise level.

The above features 413 represent an assessment of a user's expertise level (a user asking a question (questioning user), a user providing an answer, or perhaps both) at the time of a specific post by the user; however, a user's expertise level may vary over time. Thus, NL system 410 extracts features from prior posting history from the user and other users taking into account the timing of the posts from which the features are extracted. NL system 410 gives more weight to features extracted from posts made by the user and other users shortly before the question or answer being evaluated, and less weight to features extracted from posts made by the user and other users long before a given question or answer being evaluated. NL system 410 may give some weight to features extracted from posts made by the user after the question or answer being evaluated if the posts are at least in the same time frame as the question or answer.

Machine learning component 412 correlates known expertise levels of users providing questions and answers in question/answer collections 401 with the extracted features 413 using machine learning techniques known in the prior art. Machine learning component 412 generates expertise model 402 based on features 413. Examples of machine learning models include, without limitation, weighted mappings, decision trees, association rules, and support vector machines. In one embodiment, machine learning component 412 generates expertise model 402 comprising separate model partitions for questions and answers. Generally speaking, known supervised machine learning techniques attempt to generalize a function or mapping from inputs to outputs, which can then be used speculatively to generate an output for previously unseen inputs.

In one example embodiment, each partition of expertise model 402 is a detection model comprising a plurality of detection modules that place text phrases of questions or answers by users into categories. Each detection module determines a probability of presence of an input phrase in a specific category and a probability of absence of the input phrase in the specific category. In the example embodiment, presence in the category indicates the user who entered the input text belongs to the category, while absence indicates the user who entered the input text does not belong to the category. The detection model is described in further detail below with reference to FIGS. 8 and 9.

FIG. 6 is a table showing examples of labeled examples of questions and answers with predetermined expertise levels of the users who provided the questions and answers in accordance with an illustrative embodiment. As shown in the depicted examples, question 1 has three answers. Answer 1A has an assessed expertise level of 1, answer 1B has an expertise level of 2, and answer 1C has an expertise level of 0. Question 2 also has three answers. Answer 2A has an assessed expertise level of 1, answer 2B has an expertise level of 0, and answer 2C has an expertise level of 3. With this formulation, it is possible to have multiple answers to a question with different probabilities of correctness. An expertise level of zero indicates a likely incorrect answer. An expertise level of one indicates the highest level of expertise, an expertise level of two is an intermediate level, and an expertise level of three has a low expertise level. Additional levels may be introduced into the system depending on the needs of the application.

In one example embodiment, a natural language system, such as NL system 410 in FIG. 4, determines a probability of correctness based on user feedback. For example, during training, the natural language system may receive a training set of labeled questions and answers, wherein one or more users provide correctness scores for the answers based on the users' knowledge of the subject matter. In another example embodiment, a user runs the questions and answers through a question answering system, such as QA system 710 in FIG. 7. The QA system then provides a confidence score for each answer, as described above with reference to FIG. 3.

This formulation is different from other multiple class classification problems, because the classes are levels of a user characteristic, such as expertise level in the above examples. Other characteristics that can be classified into levels include language fluency, urgency level, or frustration level, for example. Such a classification places question or answer examples, or more specifically their authors, into increasing or decreasing characteristic levels (e.g., low, intermediate, and high). The aspects of the illustrative embodiments apply to any classification that places an input text into levels of a characteristic of an author of the input text within the scope of this disclosure.

Thus, NL system 410 trains expertise model 402 using a supervised machine learning technique, as described above and in further detail below, and labeled examples in question/answer collections 401 having assigned expertise values. In one illustrative embodiment, machine learning component 412 generates expertise model 402 as a probabilistic model. In one example embodiment, NL system 410 trains separate models for posts tagged as questions and for posts tagged as answers. Using machine learning techniques, based on extracted features 413, including but not limited to the example features listed above, machine learning component 412 classifies or detects posts into classes that correspond to expertise levels.

FIG. 7 is a block diagram of a question answering system with output tailored to expertise level in accordance with an illustrative embodiment. Question answering (QA) system 710 receives an expertise model 702 (also shown in FIG. 4 as 402) to tailor system output in candidate answers 703. QA system 710 receives input question 701 from a questioning user. Annotation engine (AE) pipeline 711 processes input question 701 and generates features 713, as described above with reference to FIG. 3.

QA system 710 uses expertise model 702, or a question partition of expertise model 702, to determine the expertise level of the questioning user based on features 713 generated from the text of input question 701. In one embodiment, QA system 710 also uses features extracted from a posting history, such as QA collections 401, to add features about the questioning user, if the questioning user can be identified as contributing questions and/or answers within the posting history.

In one embodiment, expertise model 702 is a probabilistic model that categorizes input question 701, or more particularly the questioning user, into an expertise level. For example, expertise model 702 may categorize the questioning user, based in part on the input question 701, as beginner, intermediate, or expert, where an intermediate user has more expertise than a beginner user and an expert user has more expertise than an intermediate user.

For example, the questioning user may enter the following input question 701: "I hope you can help a newbie, but I don't know what is happening with my computer. I installed a media server and now it tells me I have to close programs. Do I need more memory?" For the purpose of determining an expertise level of the questioning user, AE pipeline 711 extracts features 713 from input question 701. In this example, input question 701 includes a specific experience level indicator, because the questioning user identifies as a "newbie," which indicates a person who is new to the field of the question. The questioning user also uses a social hedge by stating that he or she does not know what is happening. Input question 701 also has a lack of specificity, because the questioning user does not provide any specific error codes, processor or memory usage values, configuration parameters, or the like. QA system 710 may also extract features from the questioning user's posting history, if available.

In another example, the questioning user may enter the following input question 701: "My computer has always connected to my WiFi, but since this morning, it identifies my home network but it shows limited and does not connect to the internet. IPv4 and IPv6 connectivity appear as enabled with good signal and max speed. I already updated the network adapter driver. But when diagnosing the connection a message appears stating the Diagnostic Policy Service is not running. If I try to repair as Administrator it says the same. So, any tip what I can do? There must be a software problem." This input question 701 has no social hedges and a high level of specificity. QA system 710 uses these features 713, as well as other features extracted from a posting history of the questioning user, if available, to determine an expertise level of the questioning user.

QA system 710 also generates answers to input question 701 using information in corpus 705, as described in further detail above. AE pipeline 711 processes the generated answers and generates features 714. QA system 710 uses expertise model 702, or an answer partition of expertise model 702, to determine an expertise level associated with each generated answer based on features 714 generated from the text of the answers. In this case, QA system 710 determines an expertise level associated with the text of the answer and not an author of the answer, because the answer may be supported by evidence from multiple sources with a plurality of authors. Furthermore, it is important for the expertise level of the answer to correlate with a determined expertise level of the questioning user, but it is not important for the author of a portion of text that is used as evidence for the answer to have the same expertise level as the questioning user. An author with a very high level of expertise may be very skilled at writing to the level of the layperson. QA system 710 selects and tailors one or more candidate answers 703 based on a determined expertise level of the questioning user.

In one example embodiment, QA system 710 selects only candidate answers 703 that have a high confidence score, as described above with reference to FIG. 3, and matches the determined expertise level of questioning user. For instance, if QA system 710 determines the questioning user has an expertise level of "beginner," then QA system 710 selects only candidate answers 603 that also have a determined expertise level of "beginner." A candidate answer with an expertise level of "expert" may be too technical for a beginning user. For example, if a beginning user asks a question concerning a performance of a Web browser, then the user may have sufficient expertise to delete temporary files or change the security level; however, that user may not have the necessary expertise to change domain name server settings, change port settings, modify key/value pairs in the registry, or the like.

In another example embodiment, with reference to FIG. 3, QA system pipeline 300 determines expertise level of the questioning user during question and topic analysis 320. QA system pipeline 300 determines a weight for generated answers corresponding to similarity of expertise level during hypothesis and evidence scoring 350. QA system 300 then applies the weight during synthesis 360 and final confidence merging and ranking 370 in FIG. 3.

In yet another example embodiment, returning to FIG. 7, QA system 710 generates candidate answers 703 to input question 701 using information in corpus 705, as described in further detail above, and modifies candidate answers 703 to match the determined expertise level of the questioning user. For example, for a beginning user, QA system 710 may expand acronyms or provide links to reference materials to explain higher level concepts. As another example, for an expert user, QA system 710 may filter unnecessary information from candidate answers 703.

Inference of the expertise level of a candidate answer is challenging because it involves not only the linguistic aspect of the natural language but also the expertise level of a human user. In other words, another level of complexity has to be considered in addition to the ambiguity of the natural language. Thus, a hypothesis testing formulation is necessary to come up with the candidate answer for a QA system. The null hypothesis represents the fact that the evidence is enough to assign a specific expertise level for a question, and the alternative hypothesis represents the fact that the evidence does not justify the fact that an answer belongs to a specific expertise level. The QA system assigns feature scores and collects supporting evidence to each candidate answer. This supporting evidence can also be used to justify the assignment of a specific expertise level to a candidate answer.

Figure 8:
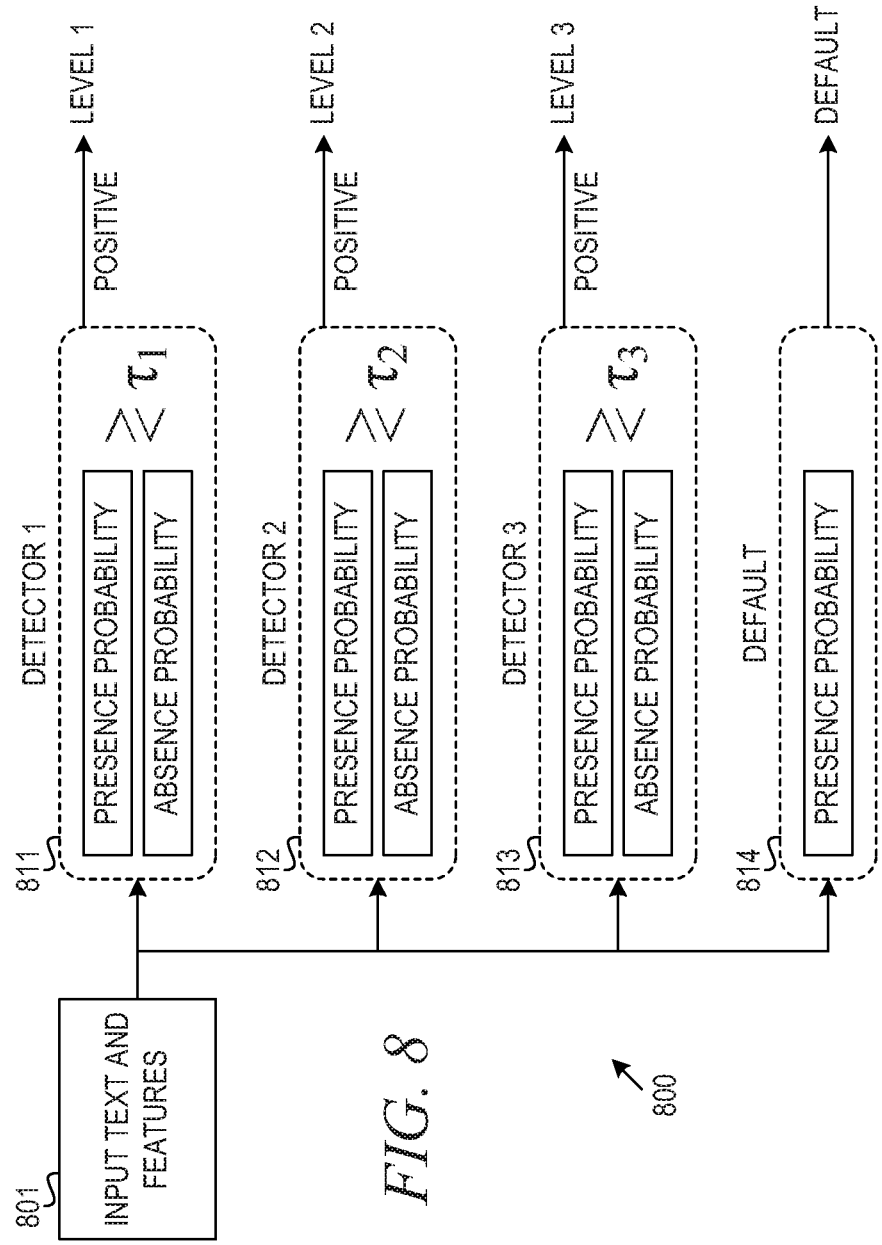
FIG. 8 depicts a parallel detection model for classifying input text into user characteristic levels in accordance with an illustrative embodiment.

FIG. 8 depicts a parallel detection model for classifying input text into user characteristic levels in accordance with an illustrative embodiment. The parallel detection model 800 receives input text and features 801. In the case of a question, the input text is the text of the question and the features are those generated by an annotation engine (AE) pipeline, as described above. In the case of an answer, the input text is the text of the answer to be presented and the features are those generated by the AE pipeline, as described above.

The parallel detection model 800 includes a plurality of detectors 811-814. Each detector 811-814 model can be evaluated using a Receiving Operating Characteristic (ROC) performance metric, which accounts for the true positive rate and false positive rate of the training instances. In signal detection theory, a receiver operating characteristic (ROC) is a graphical plot that illustrates the performance of a binary classifier system as its discrimination threshold is varied. It is created by plotting the fraction of true positives out of the total actual positives (TPR=true positive rate) vs. the fraction of false positives out of the total actual negatives (FPR=false positive rate), at various threshold settings.

Thus, each detector 811-814 is composed of two discriminant functions. The first function indicates the probability of the presence of the input text and features in the respective characteristic level. The first discriminant function is as follows:

$$p(X|\theta_0^{(1)})$$

This function computes the probability that the features, X, are coming from characteristic level 1. The function $\theta_0^{(1)}$ describes the features that fit characteristic level 1. The natural language system can estimate parameters for this function from features from the training data from characteristic level 1 without including feature values extracted from characteristic level 2 and characteristic level 3.

Using the example of an expertise characteristic, input text 801 may have features of a high level of specificity and references to product documentation, system log message, and attached log files. A natural language system trained in the manner described above will associate this input text and features 801 with a high expertise level, i.e., level 1, with a high probability and will associate input text and features 801 with an intermediate expertise level or a beginning level with a low probability (i.e., a high absence probability in level 1).

As another example, a user may enter input text 801 having the following features: words in all capital letters, exclamation points, curse words. A natural language system trained in the manner described above will associate this input text and features 801 with a high frustration level, i.e., level 1, with a high probability and will associate input text and features 801 with a medium frustration level or a low frustration level with a low probability (i.e., a high absence probability in level 1).

For detector 2 712, the first discriminant function is as follows:

$$p(X|\theta_0^{(2)}).$$

This function computes the probability that the features, X, are coming from characteristic level 2. The function $\theta_0^{(2)}$ describes the features that fit characteristic level 2. The natural language system can estimate parameters for this function from features from the training data from characteristic level 2 without including feature values extracted from characteristic level 1 and characteristic level 3. During training, as the natural language system encounters input text 801 that is known to be associated with a user having characteristic level 2 (e.g., a user of intermediate expertise level, intermediate language fluency, etc.), the natural language system refines function $\theta_0^{(2)}$ such that the parameters of this function map features of input text 801, as well as features extracted from a posting history of the author, if available, to a high probability of presence in characteristic level 2 and to a low probability of absence from characteristic level 2.

For detector 3 713, the first discriminant function is as follows:

$$p(X|\theta_0^{(3)}).$$

This function computes the probability that the features, X, are coming from characteristic level 3. The function $\theta_0^{(3)}$ describes the features that fit characteristic level 3. The natural language system can estimate parameters for this function from features from the training data from characteristic level 3 without including feature values extracted from characteristic level 1 and characteristic level 2. Thus, in the example of expertise level, input text and features 801 from a user having a beginner expertise level (i.e., level 3) may have social hedges, lack of specificity, and specific experience level indicators (e.g., "newbie"). During training, as the natural language system encounters input text 801 that is known to be associated with a user having a beginner expertise level, the natural language system refines function $\theta_0^{(3)}$ such that the parameters of this function map features of input text 801, as well as features extracted from a posting history of the user, if available, to a high probability of presence in characteristic level 3.

The second function indicates the absence of the input text and features from the specific level. The second discriminant function is as follows:

$$p(X|\overline{\theta_0^{(1)}})$$

This function computes the probability that the features, X, are coming from both characteristic level 2 and characteristic level 3. The function $\overline{\theta_0^{(1)}}$ describes the features that fit both characteristic level 2 and characteristic level 3. The natural language system can estimate parameters for this function from features from the training data from characteristic level 2 or characteristic level 3 without including feature values extracted from characteristic level 1.

$$p(X|\theta_0^{(2)})$$

This function computes the probability that the features, X, are coming from both characteristic level 1 and characteristic level 3. The function $\theta_0^{(2)}$ describes the features that fit both characteristic level 1 and characteristic level 3. The natural language system can estimate parameters for this function from features from the training data from characteristic level 1 or characteristic level 3 without including feature values extracted from characteristic level 2.

$$p(X|\theta_0^{(3)})$$

This function computes the probability that the features, X, are coming from both characteristic level 1 and characteristic level 2. The function $\theta_0^{(3)}$ describes the features that fit both characteristic level 1 and characteristic level 2. The natural language system can estimate parameters for this function from features from the training data from characteristic level 1 or characteristic level 2 without including feature values extracted from characteristic level 3.

Both the first discriminant function and the second discriminant function can be designed from the logistic regression model as currently implemented in question answering systems. Logistic regression produces a score between 0 and 1 according to the following formula:

$$f(x) = \frac{1}{1 + e^{-\beta_0 - \Sigma_{m=1}^M \beta_m x_m}},$$

where m ranges over the M features for instance x and $\beta_0$ is the "intercept" or "bias" term.

An instance x is a vector of numerical feature values, corresponding to one single occurrence of whatever the logistic regression is intended to classify. Output f(x) is used like a probability, and learned parameters $\beta_m$ are interpreted as "weights" gauging the contribution of each feature. For example, a logistic regression to classify carrots as edible or inedible would have one instance per carrot, and each instance would list numerical features such as the thickness and age of that carrot. The training data consist of many such instances along with labels indicating the correct f(x) value for each (e.g., 1 for edible and 0 for inedible carrots). The learning system computes the model (the β vector) that provides the best fit between f(x) and the labels in the training data. That model, shown as θ above, is then used on test data to classify instances.

In the illustrative embodiment, instances correspond to individual questions or answers, and the numerical values for the instance vector are features computed by the annotation engines in the pipeline. The labels on the training data encode whether the input text is of a particular expertise level. Thus, machine learning component 412 in FIG. 4 learns the values for the β vector that best distinguish expertise levels for the training data. That is, the detector model shown in FIG. 8 uses the corresponding labels from the question and answer collections to obtain the first discriminant function for each expertise level. For example, detector 1 811 is trained using questions and/or answers having an expertise level of 1 as positive instances, detector 2 812 is trained using questions and/or answers having an expertise level of 2, and detector 3 813 is trained using questions and/or answers having an expertise level of 3. Those β values are then used on input text and features 801 to determine the presence probability and the absence probability for each detector 811-814.

As an example, for a questioning user asking an input question in the training data, the learning system receives a vector of numerical feature values. This vector of numerical feature values comprises Boolean values (e.g., is a social hedge present? (1 for yes, 0 for no)), percentages (e.g., what is the percentage of posts providing answers versus questions in the questioning user's posting history?), and other numerical values (e.g., how long has the questioning user been a posting in a support forum?). The learning system uses logistic regression to determine the weights (the β vector) that provide the best fit between f(x) and the labels in the training data (is the questioning user labeled as a beginner, intermediate, or expert user?).

The second discriminant function is not level dependent. All level detectors 811-813 use a common discriminant function for absence probability. In other words, the purpose of each level detector 811-813 is to discriminate between the level-dependent specific likelihood with the likelihood of the common model, which corresponds to default detector 814. This design strategy reduces the data requirement and improves the robustness of the level detectors 811-813.

For computational simplicity, one may represent the ratio of the absence probability and the presence probability in the log domain. Thus, the ratio between the presence and the absence probability becomes the difference of the log of the presence and absence probability. The difference is usually positive if the presence probability is greater than the absence probability. The difference is negative if the absence probability is greater than the presence probability. The thresholding value r can be computed from analyzing the distribution of the difference between the presence and the absence probabilities.

In case the detection procedures fail to obtain any positive detection result, then the question-answering system will return a default answer, which is consider to be most common denominator for most average users.

In accordance with an illustrative embodiment, each detector 811-814 uses the outputs from multiple routes and phases in the final merging and ranking stage 370 in FIG. 3. Each of detectors 811-814 can be independently trained and the ROC curves can also be independently evaluated based on training data or continuously based on feedback. In one example embodiment, an administrator adjusts detectors 811-813 to achieve a balance between true-positive rate and false-positive rate. Detector 814 serves as the default statistical model, which is usually used to assign confidence levels to candidate answers.

In the parallel model of FIG. 8, more than one detector 811-714 can detect input text and features 801 and place input question and features 801 in more than one category. For example, detector 811 and detector 812 can both detect input text 801 by an expert user as fitting both the expert model and the intermediate model.

In some embodiments, the categories in the parallel model of FIG. 8 are not characteristic levels; rather, in these embodiments, the levels may be different categories. In one example, input text and features 801 are written in English by a user for whom English is not the first or primary language. The learning system trains detectors 811-813 with features fitting users writing in English but for whom various other languages are the primary languages. Each language may have specific sentence structures or word choices that manifest themselves in written text. Thus, detectors 811-813 determine presence and absence probabilities based on features, such as use of gerunds, lack of articles, gender agreement of pronouns, etc. In this example, the system can perform actions based on the categorization of the input text. For instance, the system can suggest an alternate language system or connect the user with a human operator who is fluent in the user's primary language.

In other embodiments, the categories in the parallel model of FIG. 8 are levels of a user characteristic, such as a degree of as language fluency, urgency level, or user frustration, for example. In the case of language fluency, the learning system trains the model with labeled examples of users of varying language fluency. Based on an input text being categorized into one or more levels, the system performs an appropriate action. For example, a QA system may tailor answer output based on the detected level of language fluency in a similar manner to the embodiments for expertise level described above and hereafter. In one embodiment, a QA system replaces words with more common synonyms or simplifies sentence structure. As another example, a system may provide contact information for a human operator who can assist with interaction with the system if the detected language fluency is sufficiently low or if a detected level of urgency or frustration is sufficiently high.

Figure 9:
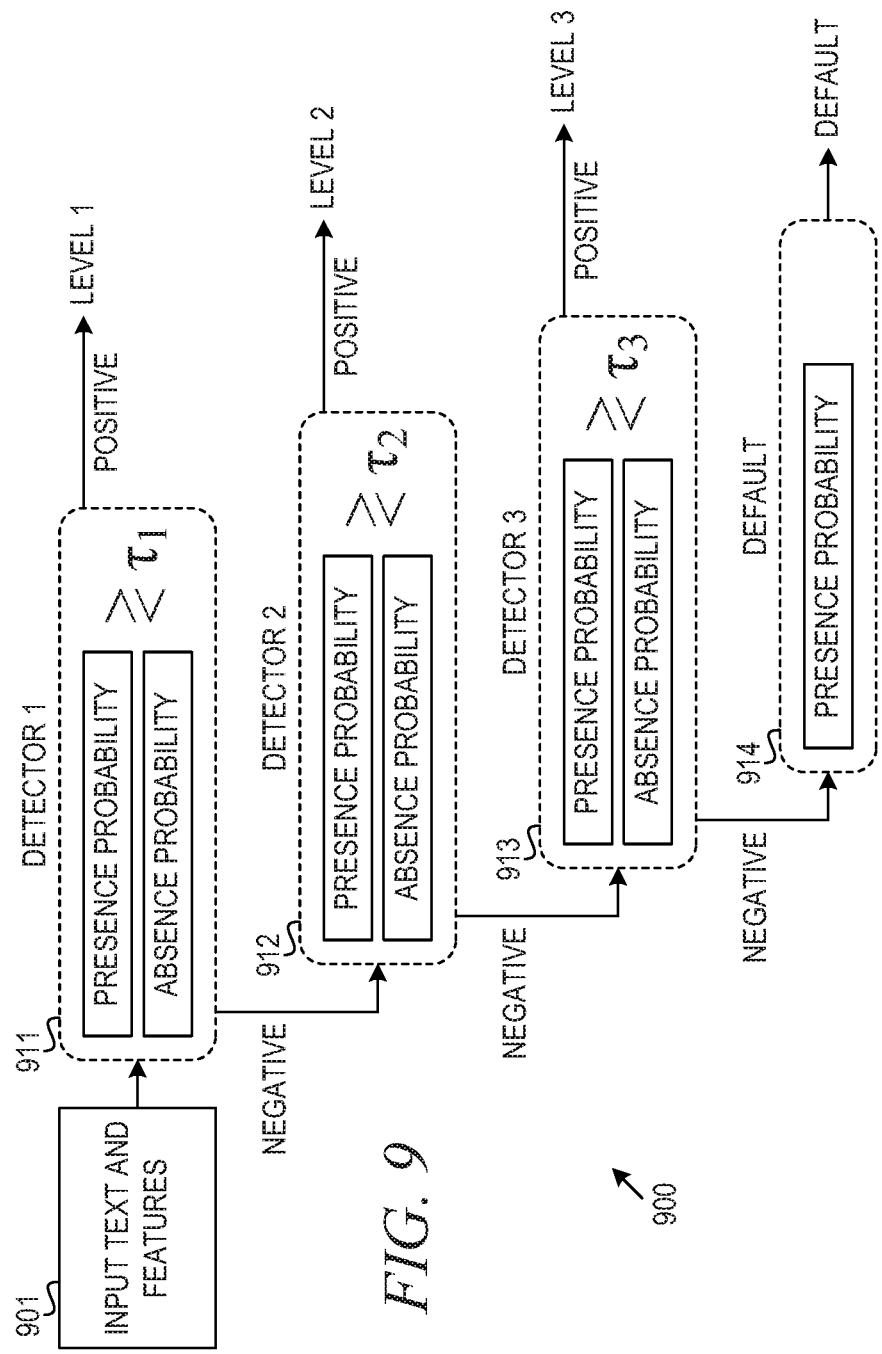
FIG. 9 depicts a sequential detection model for classifying input text into user characteristic levels in accordance with an illustrative embodiment.

FIG. 9 depicts a serial detection model for classifying input text into user characteristic levels in accordance with an illustrative embodiment. The serial detection model 900 receives input text and features 901. In the case of a question, the input text is the text of the question and the features are those generated by an annotation engine (AE) pipeline. In the case of an answer, the input text is the text of the answer to be presented and the features are those generated by the AE pipeline.

The serial detection model 900 includes a plurality of detectors 911-914. Each detector 911-914 model can be evaluated using a Receiving Operating Characteristic (ROC) performance metric, which accounts for the true positive rate and false positive rate of the training instances. The first discriminant function (presence probability) and the second discriminant function (absence probability) are the same as the parallel expertise detection model described above with respect to FIG. 8. Setting the threshold parameters for the parallel paradigm involves analysis of multiple ROC curves. The serial model, however, can adjust the threshold parameters according to the characteristic levels. In one embodiment, the threshold for detector 1 911 is set to a highest value, the threshold for detector 2 912 is lower than that for detector 1 911 and higher than that for detector 3 913, and the threshold for detector 3 913 is set to a lowest value among the three detectors 911-913. The threshold values $\tau_1$, $\tau_2$, $\tau_3$ are usually different. They may be set to be the same value to obtain a simpler framework.

In this sequential model, if detector 1 911 detects a positive result, i.e., input text 901 belongs to characteristic level 1, then the serial model places input text 901 in characteristic level 1. In the case of expertise level, the serial model places the questioning user, a candidate answer, or other input text 901 in characteristic level 1.

If detector 1 911 detects a positive result, then the model completes for the current instance of input text and features 901. However, if detector 911 detects a negative result, i.e., input text and features 901 do not fit the level 1 model, then detector 2 912 processes input text and features 901. In turn, detector 2 912 places input text 901 into the characteristic level 2 category or passes input text and features 901 to detector 3 913, and detector 3 913 places input text 901 into the characteristic level 3 category or passes input text and features 901 to default detector 914.

The parallel model of FIG. 8 is more flexible than the serial model, because the serial model allows an input text to have only a single category level, while the parallel detection model allows an input text to be assigned multiple category levels. Thus, in the case of expertise level, a candidate answer may be presented based on whether the probability value exceeds an associated threshold or not.

In one illustrative embodiment, a QA system evaluates an expertise level of a user for a given question presented at runtime using a question partition of a trained model for detecting classification with graded classes. A user poses a question to the QA system during runtime. In addition to the conventional feature generation procedure, the QA system generates additional features from the question text to be used with the expertise detection model. Additional features indicating the expertise level of the user may be included if the system has access to them. For example, if this mechanism is being fielded within an online product support agent, it may know on what date the user purchased the product or on what date the user registered for the online support site.

Note that this technique can make use of, but not require, any metadata about the particular user currently posing the question at runtime. Instead, inferences about the user's expertise level are drawn from the user's posed question. The QA system extracts features for the detection models directly from the user's posed question. In one illustrative embodiment, the QA system generates candidate answers by the conventional QA pipeline. During the Final Merging and Ranking (FMR) stage 380, the QA system detects the expertise level and boosts candidate answers detected to be at the appropriate level in the results list.

In one illustrative embodiment, the QA system tailors the output answers using the answer portion of a trained model for detecting classification with graded classes. The QA system feeds evaluation of the question's exhibited expertise level into the QA system output components. The QA system uses the question's expertise level in any manner appropriate to the use case, as determined by system designers. The QA pipeline can use the expertise level to tailor both pipeline-internal and user interface decisions, for example:

to construct or otherwise provide an answer that is similar to those instances from the training data that were provided for questions with the same level of expertise as the current question. This could include modifying the vocabulary word chosen to express a particular concept or the level of presupposed knowledge to the stated answers. For instance, if one senses that a user asking a question on a Java™ programming topic is a new user, the answer might refer to the development environment as "an IDE such as Eclipse"; however, for a power user, the phrase "an IDE" is sufficient.

to provide an answer to the user in a more granular or step-by-step fashion, rather than aggregating a lot of information into one response.

to point the user to varied system resources for additional information based on whether he/she is a beginning or advanced user.

to adapt the visualization strategy for system outputs, such as preferring more charts and graphs for novice users versus text-based evidence presentation for users with a higher expertise level.

While FIGS. 8 and 9 depict a three-level model, these embodiments are examples and are not intended to limit the present invention. More or fewer levels of classification may be used depending on the use case.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 10:
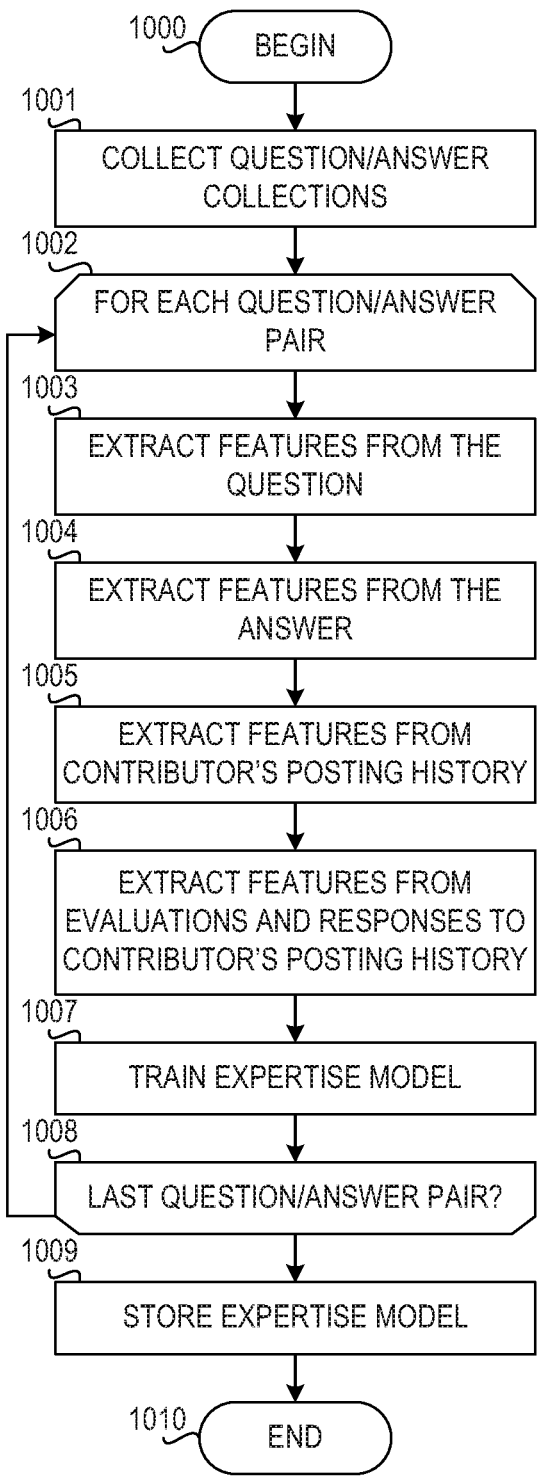
FIG. 10 is a flowchart illustrating operation of training an expertise model for tailoring question answering system output based on user expertise in accordance with an illustrative embodiment.

FIG. 10 is a flowchart illustrating operation of training an expertise model for tailoring question answering system output based on user expertise in accordance with an illustrative embodiment. Operation begins (block 1000), and a natural language system collects labeled questions and answers from collections (block 1001). These questions and answers are from a plurality of users within an online community, for example. The natural language system may collect the examples for training the model from threaded online discussions, email questions sent to a customer service department, online customer service chats or forum posts, or any other format where domain-specific questions and responses are collected.

For each question/answer pair (block 1002), matching a given question to at least one potential answer to the question, the natural language system extracts features from the given question (block 1003) that contribute to determining expertise level of the questioning user. The natural language system extracts features from the corresponding potential answer (block 1004) that contribute to determining an expertise level of the answering user. The natural language system then extracts further features from each user's posting history (block 1005), including previous questions and/or answers in the same or different sources in the collection, that may further contribute to determining an expertise level of the questioning or answering. The natural language system also extracts features from evaluations and responses to each user's posting history that inform the user's expertise level (block 1006). These evaluations and responses may be votes, ratings, or responses indicating agreement or disagreement, for example. Thereafter, the natural language system trains the expertise model (block 1007). The manner in which the natural language system trains the model depends on the type of machine learning model being used.

In one embodiment, the expertise model comprises separate model partitions for questions and answers. The supervised learning algorithm attempts to generalize a function or mapping from inputs to outputs which can then be used speculatively to generate an output for previously unseen inputs. Examples of machine learning models include, without limitation, weighted mappings, decision trees, association rules, and support vector machines. For example, in some embodiments, the natural language system adjusts weights for the features to fit the model to the labeled examples.

The natural language system determines whether the question/answer pair is the last question/answer pair in the collection (block 1008). If the question/answer pair is not the last pair, operation returns to block 1002 to consider the next question/answer pair. The natural language system continues to repeat the operations of blocks 1002-1008 until all question/answer pairs have been processed. The more labeled examples in the training data (the question/answer pairs), the more accurate the resulting expertise model will be. If the question/answer pair is the last question/answer pair, the natural language system stores the expertise model (block 1009). Thereafter, operation ends (block 1010). That is, once the natural language system has processed all of the question/answer pairs, the natural language system has completed the operation of training an expertise model for tailoring question answering system output based on user expertise.

Figure 11:
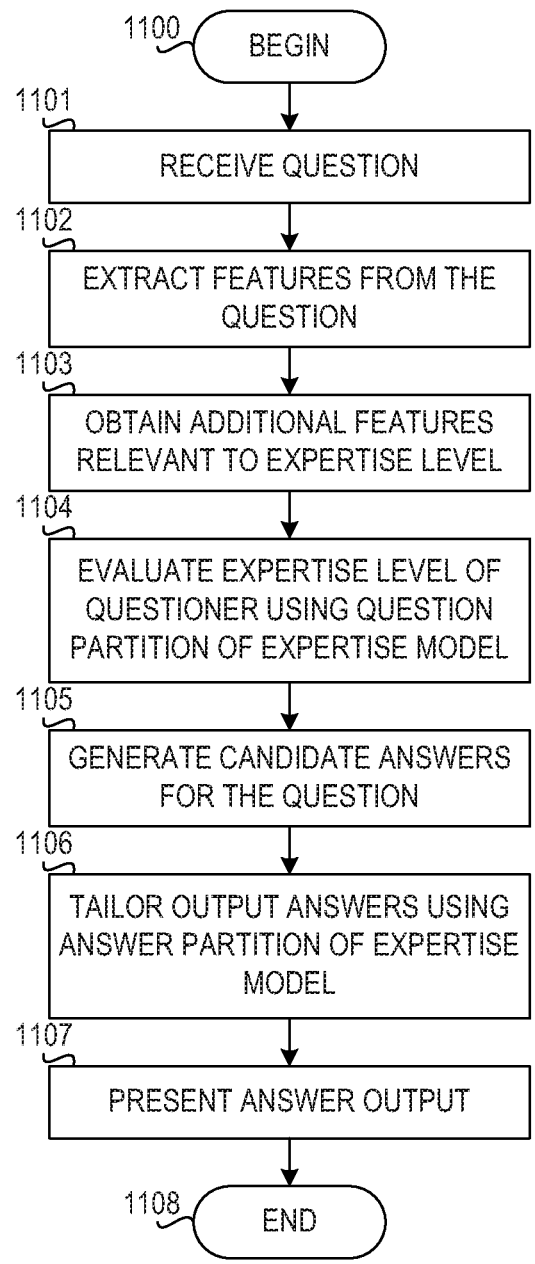
FIG. 11 is a flowchart illustrating operation of a question answering system for tailoring output to an expertise level of the question in accordance with an illustrative embodiment.

FIG. 11 is a flowchart illustrating operation of a question answering system for tailoring output to an expertise level of the question in accordance with an illustrative embodiment. Operation begins (block 1100), and the question answering (QA) system receives an input question (block 1101). The QA system extracts features from the input question (block 1102). An annotation engine (AE) pipeline in the QA system processes the input question and generates features that contribute to generating candidate answers to the input question, as described above with reference to FIG. 3, as well as features that contribute to determining an expertise level of the questioning user, as described above with reference to FIG. 4. The QA system obtains additional features relevant to the expertise level of the questioning user (block 1103). For example, the QA system also uses features extracted from a posting history, such as QA collections 401 in FIG. 4, to add features about the questioning user, if the questioning user can be identified as contributing questions and/or answers within the posting history.

The QA system then evaluates an expertise level of the questioning user using a question portion of the expertise model (block 1104). The QA system uses the expertise model, or a question partition of the expertise model, to determine the expertise level of the questioning user based on the features generated from the text of input question in block 1102 and the additional features extracted in block 1103 from the questioning user's posting history, such as QA collections 401 in FIG. 4, to add features about the questioning user, if the questioning user can be identified as contributing questions and/or answers within the posting history. In one embodiment, the expertise model is a probabilistic model that categorizes the questioning user into an expertise level. For example, the expertise model may categorize the questioning user, based in part on the input question, as beginner, intermediate level, or expert, where an intermediate user has more expertise than a beginner user and an expert user has more expertise than an intermediate user.

The QA system then generates candidate answers for the question (block 1105), as described above with reference to FIG. 3. The QA system tailors output answers using the answer partition of the expertise model (block 1106). In one embodiment, the QA system feeds evaluation of the questioning user's exhibited expertise level into the QA system output components. The QA system uses the questioning user's expertise level in any manner appropriate to the use case, as determined by system designers. For example, the QA system may construct or otherwise provide an answer that is similar to those instances from the training data that were provided for questions with the same level of expertise as the current question. The QA system may provide an answer to the user in a more granular or step-by-step fashion rather than aggregating a lot of information into one response. As another example, the QA system may point the user to varied system resources for additional information based on whether he/she is a beginning or advanced user. The QA system may also adapt the visualization strategy for system outputs, such as preferring more charts and graphs for novice users versus text-based evidence presentation for users with a higher expertise level. The QA system then presents the answer output (block 1107), and operation ends (block 1108).

Figure 12:
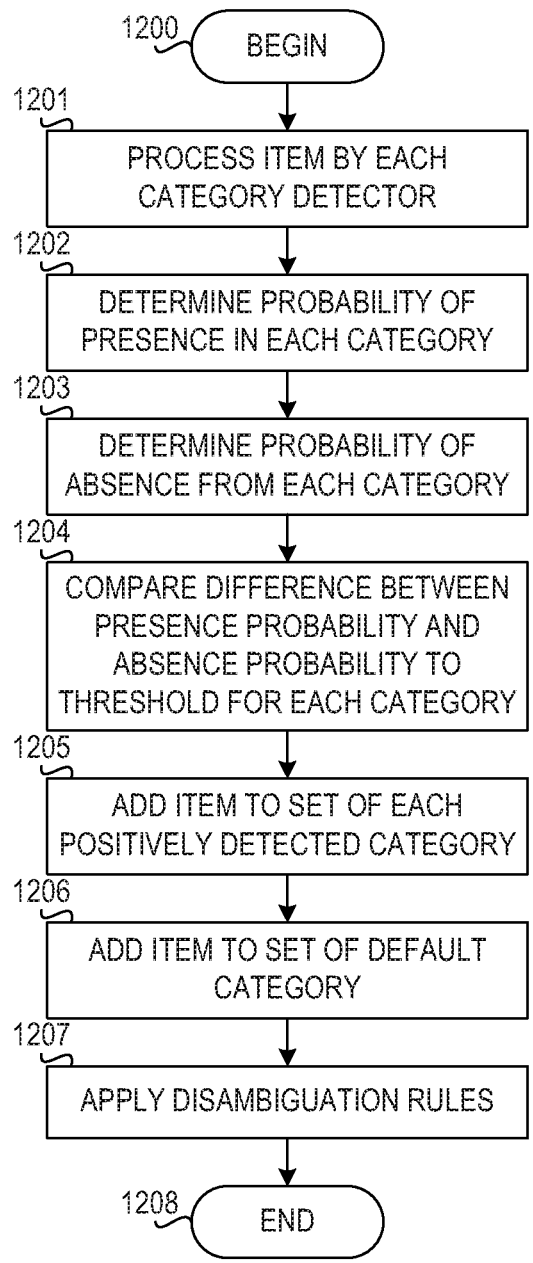
FIG. 12 is a flowchart illustrating operation of a parallel detection model for classifying input text into user characteristic levels in accordance with an illustrative embodiment.

FIG. 12 is a flowchart illustrating operation of a parallel detection model for classifying input text into user characteristic levels in accordance with an illustrative embodiment. Operation beings (block 1200), and the model processes a received item by each category detector (block 1201). The parallel detection model receives input text and features. In the case of a question, the input text is the text of the question and the features are those generated by an annotation engine (AE) pipeline, as described above. In the case of an answer, the input text is the text of the answer to be presented and the features are those generated by the AE pipeline, as described above.

The model determines a probability of presence in each category (block 1202) and determines a probability of absence from each category (block 1203). The parallel detection model includes a plurality of detectors, each being composed of two discriminant functions. The first function indicates the probability of the presence of the input text and features in the respective characteristic level. The second function indicates the absence of the input text and features from the respective characteristic level. Both the first discriminant function and the second discriminant function can be designed from the logistic regression model as currently implemented in question answering systems, as described in further detail above The model then compares a difference between the presence probability and the absence probability to a threshold for each category (block 1204). A positive result indicates the difference is greater than the threshold and the item fits the respective characteristic level, while a negative result indicates the difference is less than the threshold and the item does not fit the respective characteristic level. For each comparison having a positive result in block 1204, the model adds the item to the set of the characteristic level (block 1205). The model adds the item to the set of a default category (block 1206). That is, in case the detection procedures fail to obtain any positive detection result, then the question-answering system will return a default answer, which is consider to be most common denominator for most average users.

In the parallel detection model, more than one detector can detect the item and place the item in more than one characteristic level. Therefore, the model applies disambiguation rules to ensure the item is not improperly detected in more than one category (block 1207). One example rule specifies if a probability of presence in one or more categories is above a first threshold, then the model removes the item from the set of the default category. Another example rule specifies if a highest probability of presence in a category is greater than a second highest probability by a second threshold, then the model removes the item from every category except the category with the highest probability. Yet another example rule specifies if every detector has a positive result, then the model removes the item from every category except the default category. Thereafter, operation ends (block 1208).

FIG. 13 is a flowchart illustrating operation of a serial detection model for classifying input text into user characteristic levels in accordance with an illustrative embodiment. Operation begins (block 1300), and the model processes a received item by a first category detector (block 1301). The serial detection model receives input text and features. In the case of a question, the input text is the text of the question and the features are those generated by an annotation engine (AE) pipeline. In the case of an answer, the input text is the text of the answer to be presented and the features are those generated by the AE pipeline.

The serial detection model includes a plurality of detectors, each being composed of two discriminant functions. The first discriminant function (presence probability) and the second discriminant function (absence probability) are the same as the parallel detection model described above with respect to FIG. 12. Thus, the serial detection model determines a probability of presence in the category (block 1302) and determines a probability of absence from the category (block 1303). The model then compares a difference between the presence probability and the absence probability to a threshold (block 1304).

The model determines whether a result of the comparison is positive or negative (block 1305). A positive result indicates the difference is greater than the threshold and the item fits the category, while a negative result indicates the difference is less than the threshold and the item does not fit the category. In the serial model, if a detector detects a positive result, i.e., input text belongs to the respective characteristic level, then the serial model places the input text in the respective characteristic level. Thus, if the comparison has a positive result in block 1305, the model adds the item to the set of the category (block 1306), and operation ends (block 1307).

If the comparison has a negative result in block 1305, the model determines whether the detector is the last characteristic level detector in the model (block 1308). If the detector is not the last detector, the model processes the item by the next category detector (block 1310), and operation returns to block 1302 to determine probability of presence in the category. The serial detection model continues to process the item until the item is detected by a characteristic level detector in block 1305. If the detector is the last detector in block 1308, and the item is not detected by a characteristic level detector, then the model adds the item to the set of the default category (block 1309), and operation ends block 1307.

Thus, the illustrative embodiments provide a model for detecting presence of a user in a category based on features of text input. The categories may be distinct categories or levels (e.g., high, medium, or low) of a user characteristic. The model comprises a detector for each category and a default category. In one illustrative embodiment, the model applies the detectors in parallel and adds an input item to all matching categories. In one example embodiment, the model applies disambiguation rules to ensure the item is not improperly detected in more than one category. In another illustrative embodiment, the model applies the detectors in series and adds the input item to the first matching category.

The illustrative embodiments provide a mechanism for inferring the expertise level of a user from text of the user's question. The mechanism uses the expertise level of the user to tailor the answers produced by a question answering system or in some other usage scenario. The mechanism learns a model of the continuum of user expertise levels for a domain, using human-to-human dialog examples harvested from online question and answer collections. The mechanism then compares user inputs at runtime to the collected information in order to tailor system behaviors based on similarity with observed human behavior in the learned model.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for tailoring question answering system output based on user expertise, the method comprising:
    training a machine learning model to form a trained expertise model, wherein the trained expertise model comprises a question partition trained using questions in a collection of question and answer postings and an answer partition trained using answers in the collection of question and answer postings;
    receiving an input question from a questioning user;
    determining a set of features associated with text of the input question, wherein determining the set of features associated with the text of the input question comprises extracting a plurality of features from the text of the input question;
    obtaining features from the questioning user's posting history within a collection of question and answer postings;
    determining an expertise level of the questioning user based on the set of features associated with the text of the input question using the question partition of the trained expertise model;
    generating one or more candidate answers for the input question; and
    tailoring output of the one or more candidate answers based on the expertise level of the questioning user.

2. The method of claim 1, wherein the plurality of features comprises at least one of content words formed into unigram/ngram lexical features, social hedges, specificity of words, specific experience level indicators, or references to external expertise.

3. The method of claim 1, wherein determining the set of features associated with the text of the input question further comprises:
    obtaining features from responses by other users to the questioning user's posting history within the collection of question and answer postings.

4. The method of claim 1, wherein generating the one or more candidate answers for the input question comprises generating the one or more candidate answers from a collection of question and answer postings.

5. The method of claim 4, wherein tailoring output of the one or more candidate answers comprises:
    determining an expertise level of a contributing user providing evidence for a given candidate answer, comprising:
        obtaining features from the contributing user's posting history within the collection of question and answer postings; and
        obtaining features from responses by other users within the collection of question and answer postings.

6. The method of claim 1, wherein tailoring output of the one or more candidate answers comprises:
    determining an expertise level of each of the one or more candidate answers using the trained expertise model; and
    ranking the one or more candidate answers based on the expertise levels of the one or more candidate answers.

7. The method of claim 1, wherein tailoring output of the one or more candidate answers comprises:
    selecting only candidate answers that have a high confidence score and match the expertise level of the questioning user.

8. The method of claim 1, wherein training the trained expertise model comprises:
    harvesting the collection of question and answer postings;
    labeling questions and answers in the collection with predetermined expertise levels;
    determining a set of features associated with text of each question and answer; and
    training the machine learning model based on the predetermined expertise levels and the sets of features associated with the text of the questions and answers to form the trained expertise model.

9. The method of claim 8, wherein determining the set of features associated with text of a given question or answer comprises:
    extracting a plurality of features from the text of the given question or answer using an annotation engine pipeline;
    obtaining features from posting history of a contributing user associated with the given question or answer; and
    obtaining features from responses by other users within the collection of question and answer postings.

10. A computer program product comprising a computer readable storage medium having a computer readable program stored therein, wherein the computer readable program, when executed on a computing device, causes the computing device to:
    train a machine learning model to form a trained expertise model, wherein the trained expertise model comprises a question partition trained using questions in a collection of question and answer postings and an answer partition trained using answers in the collection of question and answer postings;
    receive an input question from a questioning user;
    determine a set of features associated with text of the input question, wherein determining the set of features associated with the text of the input question comprises extracting a plurality of features from the text of the input question;
    obtain features from the questioning user's posting history within a collection of question ad answer postings;
    determine an expertise level of the questioning user based on the set of features associated with the text of the input question using the question partition of the trained expertise model;
    generate one or more candidate answers for the input question; and
    tailor output of the one or more candidate answers based on the expertise level of the questioning user.

11. The computer program product of claim 10, wherein tailoring output of the one or more candidate answers comprises:
    determining an expertise level of each of the one or more candidate answers using the trained expertise model; and
    ranking the one or more candidate answers based on the expertise levels of the one or more candidate answers.

12. The computer program product of claim 10, wherein tailoring output of the one or more candidate answers comprises:
selecting only candidate answers that have a high confidence score and match the expertise level of the questioning user.

13. The computer program product of claim 10, wherein training the trained expertise model comprises:
harvesting the collection of question and answer postings;
labeling questions and answers in the collection with predetermined expertise levels;
determining a set of features associated with text of each question and answer, and
training the machine learning model based on the predetermined expertise levels and the sets of features associated with the text of the questions and answers to form the trained expertise model.

14. The computer program product of claim 10, wherein determining the set of features associated with the text of the input question further comprises:
obtaining features from responses by other users to the questioning user's posting history within the collection of question and answer postings.

15. The computer program product of claim 10, wherein generating the one or more candidate answers for the input question comprises generating the one or more candidate answers from a collection of question and answer postings.

16. The computer program product of claim 10, wherein determining the set of features associated with text of a given question or answer comprises:
extracting a plurality of features from the text of the given question or answer using an annotation engine pipeline;
obtaining features from posting history of a contributing user associated with the given question or answer; and
obtaining features from responses by other users within the collection of question and answer postings.

17. An apparatus comprising:
a processor; and
a memory coupled to the processor, wherein the memory comprises instructions which, when executed by the processor, cause the processor to:
train a machine learning model to form a trained expertise model, wherein the trained expertise model comprises a question partition trained using questions in a collection of question and answer postings and answer partition trained using answers in the collection of question answer postings;
receive an input question from a questioning user;
determine a set of features associated with text of the input question, wherein determining the set of features associated with the text of the input question comprises extracting a plurality of features from the text of the input question using an annotation engine pipeline in the data processing system;
obtain features from the questioning user's posting history within a collection of question and answer postings;
determine an expertise level of the questioning user based on the set of features associated with the text of the input question using the question partition of the trained expertise model;
generate one or more candidate answers for the input question; and
tailor output of the one or more candidate answers based on the expertise level of the questioning user.

18. The apparatus of claim 17, wherein tailoring output of the one or more candidate answers comprises:
determining an expertise level of each of the one or more candidate answers using the trained expertise model; and
ranking the one or more candidate answers based on the expertise levels of the one or more candidate answers.

19. The apparatus of claim 17, wherein training the trained expertise model comprises:
harvesting the collection of question and answer postings;
labeling questions and answers in the collection with predetermined expertise levels;
determining a set of features associated with text of each question and answer; and
training the machine learning model based on the predetermined expertise levels and the sets of features associated with the text of the questions and answers to form the trained expertise model.

20. The computer program product of claim 15, wherein tailoring output of the one or more candidate answers comprises:
determining an expertise level of a contributing user providing evidence for a given candidate answer, comprising:
obtaining features from the contributing user's posting history within the collection of question and answer postings; and
obtaining features from responses by other users within the collection of question and answer postings.

* * * * *